(12) United States Patent
Nagler

(10) Patent No.: US 7,723,860 B2
(45) Date of Patent: May 25, 2010

(54) PIPELINE DEPLOYED HYDROELECTRIC GENERATOR

(75) Inventor: Ehud Nagler, Kiryat Tivon (IL)

(73) Assignee: Hydro-Industries Tynat Ltd, Rosh Haayin (IL)

( * ) Notice: Subject to any disclaimer, the term of this patent is extended or adjusted under 35 U.S.C. 154(b) by 0 days.

(21) Appl. No.: 11/568,856

(22) PCT Filed: Oct. 3, 2006

(86) PCT No.: PCT/IL2006/001145

§ 371 (c)(1),
(2), (4) Date: Nov. 9, 2006

(87) PCT Pub. No.: WO2007/036943

PCT Pub. Date: Apr. 5, 2007

(65) Prior Publication Data

US 2008/0284174 A1 Nov. 20, 2008

Related U.S. Application Data

(60) Provisional application No. 60/721,985, filed on Sep. 30, 2005.

(51) Int. Cl.
*F03B 13/00* (2006.01)
*F03B 13/10* (2006.01)

(52) U.S. Cl. .......................... 290/54; 290/43

(58) Field of Classification Search .................. 290/43, 290/54, 55, 1 R; 60/398; 415/210.1, 7, 3.1, 415/2.1; 166/65.1
See application file for complete search history.

(56) References Cited

U.S. PATENT DOCUMENTS

| | | | |
|---|---|---|---|
| 4,176,283 A | 11/1979 | McLaren | |
| 4,555,637 A * | 11/1985 | Irvine | 290/52 |
| 4,731,545 A | 3/1988 | Lerner et al. | |
| 4,740,711 A * | 4/1988 | Sato et al. | 290/52 |
| 4,838,310 A | 6/1989 | Scott et al. | |
| 6,011,334 A * | 1/2000 | Roland | 310/86 |
| 6,661,112 B2 * | 12/2003 | Zeier et al. | 290/43 |
| 6,798,080 B1 * | 9/2004 | Baarman et al. | 290/43 |
| 6,848,503 B2 * | 2/2005 | Schultz et al. | 166/66.5 |
| 7,091,628 B1 * | 8/2006 | Balt | 290/54 |
| 7,112,892 B2 * | 9/2006 | Mahowald | 290/54 |

FOREIGN PATENT DOCUMENTS

DE 4425294 2/1996

* cited by examiner

*Primary Examiner*—Julio Gonzalez
(74) *Attorney, Agent, or Firm*—Mark M. Friedman

(57) ABSTRACT

The hydroelectric generator of the present invention provides a pre-sealed, watertight device in which the rotor that includes the induction magnets is deployed within the main flow passage of the pipeline and thereby sealed within the pipeline, and he induction coil assembly is deployed outside of the pipeline such that the fluid is sealed within the pipeline away from the induction coils.

25 Claims, 27 Drawing Sheets

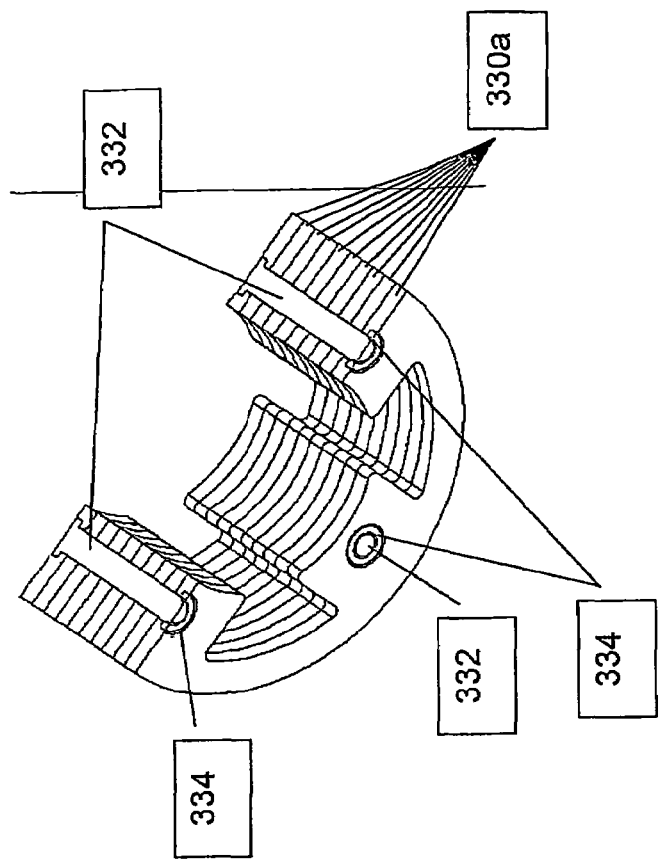
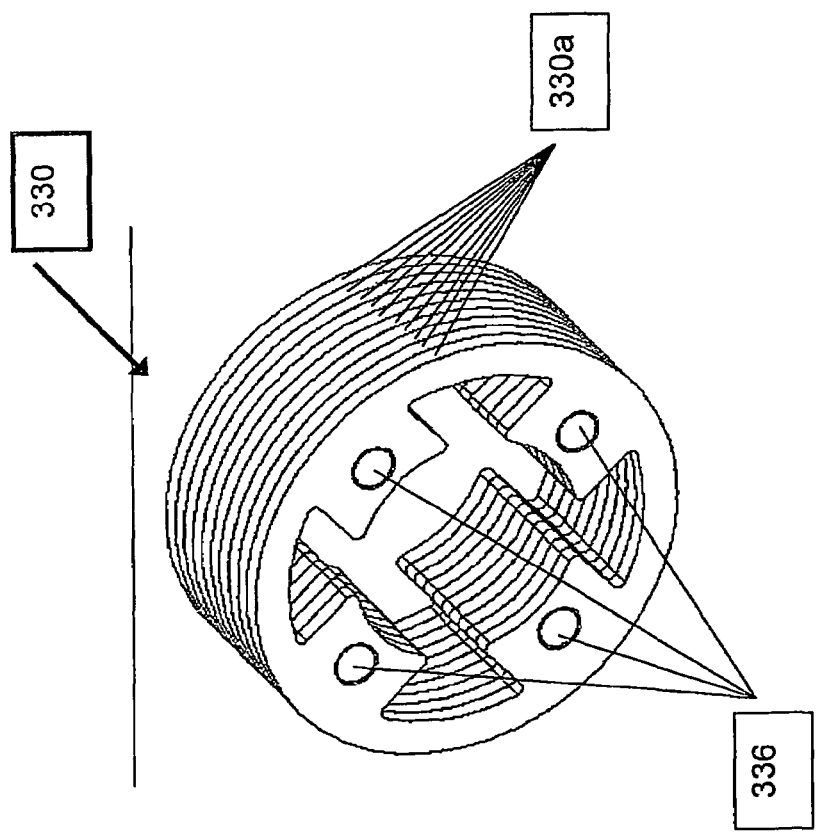
FIG. 9B
FIG. 9A

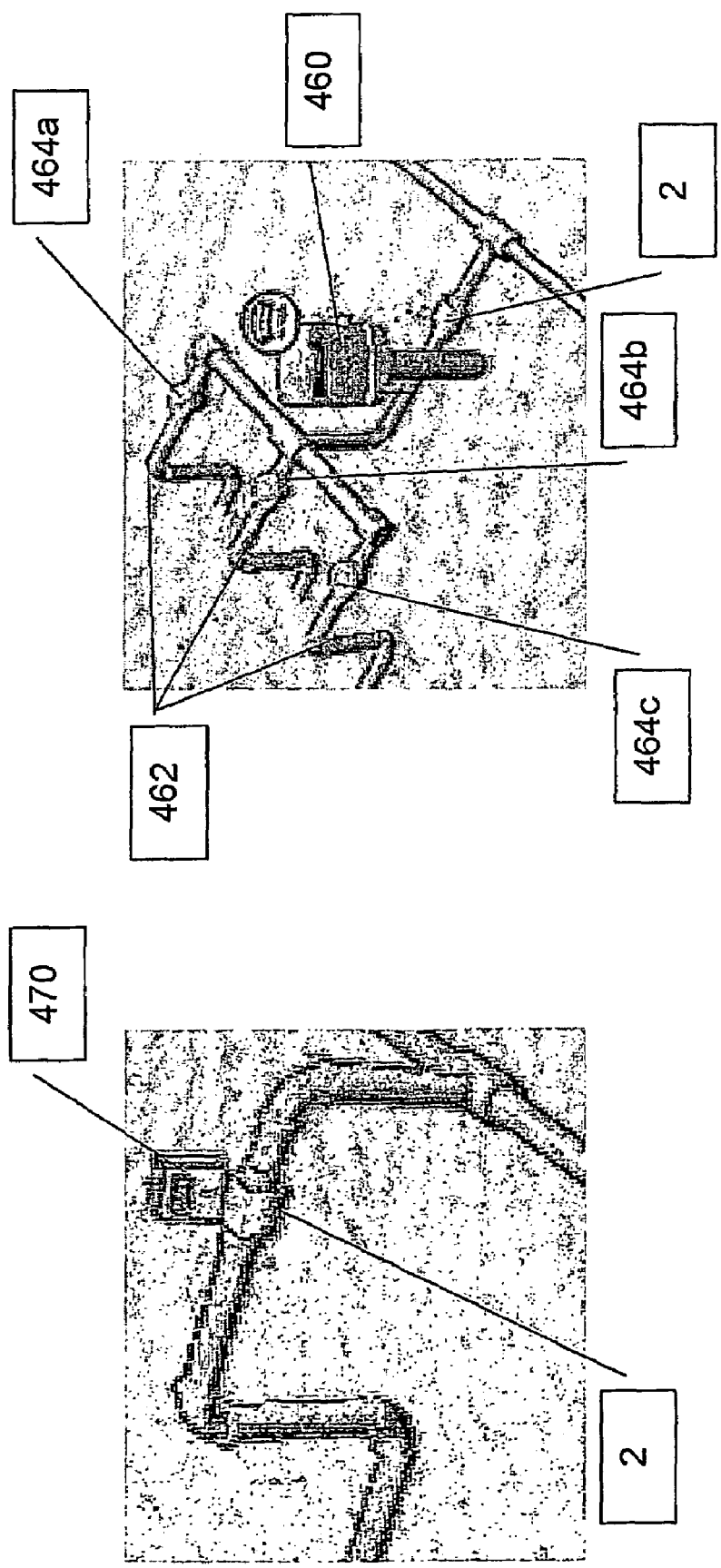

though the pipeline causes rotation of the armature upon which the coils are wound. This is a very large device in comparison to the pipeline in which it is deployed.
PIPELINE DEPLOYED HYDROELECTRIC GENERATOR

FIELD AND BACKGROUND OF THE INVENTION

The present invention relates to hydroelectric generators and, in particular, it concerns a hydroelectric generator in which the turbine rotor is deployed within the fluid flow path of the pipeline and the turbine rotor whose rotation is effected by the flow of fluid through the pipeline also serves as the magnetic armature of the generator.

Hydroelectric generators that are powered by the flow of fluid through a pipeline are known in the art. U.S. Pat. No. 4,838,310 discloses a standard generator deployed outside of a pipeline that is mechanically linked to a separate rotor that is deployed within the pipeline, such that fluid flow through the pipeline causes rotation of the rotor which in turn causes rotation of the armature of the generator. The rotor, however, is not part of the generator itself.

Described in U.S. Pat. No. 4,176,283 is a hydroelectric generator in which the axle of the armature is a hollow pipe containing inwardly extending turbine blades. The generator is deployed as a length of the pipeline such that the flow of fluid through the pipeline causes rotation of the armature upon which the coils are wound. This is a very large device in comparison to the pipeline in which it is deployed.

German Patent No. DE 4,425,294 is directed toward a hydroelectric generator that includes a turbine area having an upstream transition piece with a tangential aligned nozzle to direct the fluid flow toward the blades of the turbine. A second transition piece, which is downstream of the turbine, is provided with openings for the passage of the fluid into the regular pipeline. This arrangement provides a high flow resistance to the flow of fluid through the pipeline.

U.S. Pat. No. 4,731,545 describes a garden hose mounted power supply unit with a paddle-wheel type rotor that has an axis of rotation that is perpendicular to the direction of fluid flow, and is turned by the flow of fluid through the hose. Here too, the paddle-wheel rotor is not part of the generator that is external to the fluid flow region of the device.

There is therefore a need for a hydroelectric generator in which the turbine rotor is deployed within the fluid flow path of the pipeline and the turbine rotor whose rotation is effected by the flow of fluid through the pipeline also serves as the magnetic armature of the generator. It would be of benefit if the generator had a simple construction and was easy to install.

SUMMARY OF THE INVENTION

The present invention is a hydroelectric generator in which the turbine rotor is deployed within the fluid flow path of the pipeline and the turbine rotor whose rotation is effected by the flow of fluid through the pipeline also serves as the magnetic armature of the generator.

According to the teachings of the present invention there is provided, a pipeline deployed electric generator comprising: a) a rotor having rotor blades extending outwardly from a central axle, the rotor being deployed within the pipeline so as to be in a fluid flow path of the pipeline such that a flow of fluid through the pipeline effects rotation of the rotor, and at least a portion of the rotor being magnetized; and b) at least one induction coil deployed on an exterior surface of the pipeline in proximity to the rotor such that a change in magnetic field caused by rotation of the rotor within the pipeline generates a flow of electric current in the induction coil.

According to a further teaching of the present invention, the at least a portion of the rotor that is magnetic is at least a portion of at least one rotor blade.

According to a further teaching of the present invention, the rotor has an axis of rotation that is substantially parallel to a central axis of the pipeline at a region of the pipeline in which the rotor is deployed.

According to a further teaching of the present invention, the rotor is configured with a substantially cylindrical wall that is spaced apart from and circumscribes the central axle of the rotor and is spaced apart form an inside wall of the pipeline and at least a portion of the rotor blades extend outwardly from the cylindrical wall.

According to a further teaching of the present invention, there is also provided a flow impedance regulator deployed in an interior region defined by the cylindrical wall so as to block fluid flow through the interior region defined by the cylindrical wall at low flow rates and allow the passage of fluid through the interior region defined by the cylindrical wall at high flow rates.

According to a further teaching of the present invention, there is also provided a fluid directing configuration associated with the rotor and configured to direct the fluid flow path so as to pass between the cylindrical wall and an interior surface of the pipeline so as to impinge of the rotor blades thereby generating rotation of the rotor.

According to a further teaching of the present invention, there is also provided a flow impedance regulator deployed in the fluid directing configuration so as to block fluid flow through an interior region of the fluid directing configuration at low flow rates and allow the passage of fluid through the interior region of the fluid directing configuration at high flow rates.

According to a further teaching of the present invention, the flow impedance regulator is configured to direct at least of portion of fluid flowing through the interior region of the fluid directing configuration to a portion of the rotor blades deployed within the interior region of the fluid directing configuration.

According to a further teaching of the present invention, the rotor has an axis of rotation that is substantially perpendicular to a central axis of the pipeline.

According to a further teaching of the present invention, there is also provided a flow-directing barrier deployed up stream and in close proximity to the rotor.

According to a further teaching of the present invention, there is also provided a generator housing having a fluid flow passage configured between inlet and outlet ports the inlet and outlet ports being configured for attachment to the pipeline, wherein the rotor is deployed within the fluid flow passage and in the fluid flow path of the pipeline, and the induction coils are deployed on an exterior surface of the generator housing such that fluid remains sealed within the pipeline with no passage of fluid to the region of the generator housing in which the induction coil is deployed.

According to a further teaching of the present invention, at least the induction coils are enclosed in a pre-sealed, water-tight casing.

According to a further teaching of the present invention, the generator housing has a length that is less than three times a diameter of the pipeline.

According to a further teaching of the present invention, the generator housing has a length that is less than two times the diameter of the pipe.

According to a further teaching of the present invention, the flow of electric current generated in the induction coils is used to power electronic components associated with at least one from the group consisting of: a fluid flow meter; a leak indicator; a fluid usage meter; a sprinkler system; a irrigation system; a lighting system; a flow control system and a fluid characteristics measurement system.

According to a further teaching of the present invention, the electronic components include at least one from the group consisting of: a radio transponder; a control circuit; a memory chip; a lighting element; a switch; a motor; a temperature sensor; a proximity sensor; a pressure sensor; a electronically operated fluid flow control valve and a sensor configured to measure chemical properties of material flowing through the pipeline.

There is also provided according to the teachings of the present invention, a system for monitoring the flow of a fluid through a pipeline, the system comprising: a) a meter housing having a fluid flow passage configured between inlet and outlet ports configured for attachment to the pipeline; b) an electronic metering system attached to the meter housing; c) a rotor having rotor blades extending outwardly from a central axle, the rotor being deployed within the meter housing so as to be in the fluid flow passage such that a flow of fluid through the fluid flow passage effects rotation of the rotor, and at least a portion of at least one rotor blade of the rotor is configured with magnetic properties; and d) at least one induction coil deployed on an exterior surface of the meter housing in proximity to the rotor such that a change in magnetic field caused by rotation of the rotor within the meter housing generates a flow of electric current in the induction coil; wherein an electric current generated in the induction coils is used to power the at least one electronic component of the meter.

According to a further teaching of the present invention, the at least one electronic component includes a radio transponder configured for communication with a remote meter-reading device.

According to a further teaching of the present invention, the at least one electronic component includes a display element configured to display a representation of a volume of fluid that has passed through the monitoring system.

According to a further teaching of the present invention, the electronic metering system is configured to determine a volume of fluid flow through the pipeline based on rotation characteristics of the rotor.

According to a further teaching of the present invention, the at least one electronic component includes an alarm system.

According to a further teaching of the present invention, the alarm system is configured to indicate when a predetermined limit of fluid flow has been reached.

There is also provided according to the teachings of the present invention, a method for generating electricity in a fluid flow pipeline, the method comprising: a) providing a rotor having rotor blades extending outwardly from a central axle, at least a portion of the rotor is a magnetic; b) deploying the rotor within the pipeline so as to be in a fluid flow path of the pipeline such that a flow of fluid through the pipeline effects rotation of the rotor; c) providing at least one induction coil; d) deploying the at least one induction coil on an exterior surface of the pipeline in proximity to the rotor such that a change in magnetic field caused by rotation of the rotor within the pipeline generates a flow of electric current in the induction coil; e) effecting rotation of the rotor by providing a flow of fluid through the pipeline.

According to a further teaching of the present invention, the at least portion of the rotor that is a magnetic is implemented as at least a portion of at least one rotor blade.

According to a further teaching of the present invention, there is also provided directing the fluid flow path toward at least a first group of rotor blades during low fluid flow rate conditions and additionally toward at least a second group of rotor blades during high fluid flow rate conditions.

BRIEF DESCRIPTION OF THE DRAWINGS

The invention is herein described, by way of example only, with reference to the accompanying drawings, wherein:

FIG. 9A is a preferred embodiment of an induction coil core constructed and operative according to the teachings of the present invention;

FIG. 9B is an isometric cross-sectional view of the embodiment of FIG. 9A;

FIG. 17 is a schematic isometric view of a hydroelectric generator of the present invention associated with a leak detector;

FIG. 18 is a schematic isometric view of a hydroelectric generator of the present invention associated with an irrigation control system;

DESCRIPTION OF THE PREFERRED EMBODIMENTS

Figure 1:
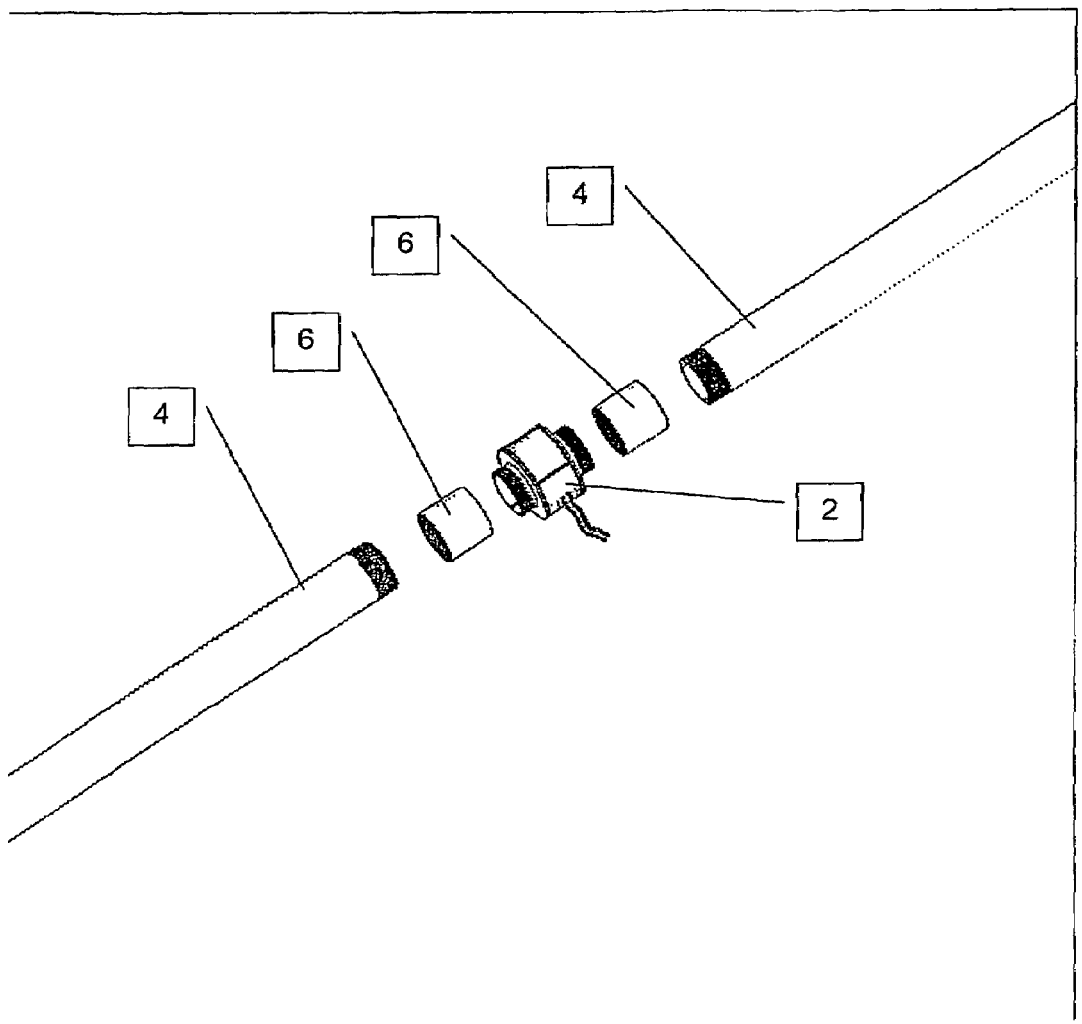
FIG. 1 is an exploded view of a pipeline containing a hydroelectric generator constructed and operative according to the teachings of the present invention.

The present invention is a hydroelectric generator in which the turbine rotor is deployed within the fluid flow path of the pipeline and the turbine rotor whose rotation is effected by the flow of fluid through the pipeline also serves as the magnetic armature of the generator.

The principles and operation of a hydroelectric generator according to the present invention may be better understood with reference to the drawings and the accompanying description.

By way of introduction, the hydroelectric generator of the present invention is deployed as part of a pipeline through which fluid flows. It should be noted that the term "hydroelectric" as used herein is not intended to limit the present invention to the generation of electricity by the flow of water only. It is used herein loosely to refer to the generation of electricity by the flow of any suitable fluid in either a liquid or a gaseous state, and especially the flow of fluid through a pipeline. Further, herein, the terms "hydroelectric generator" and "generator" may be used interchangeably.

It should also be noted that the term "pipeline" as used herein refers to any suitable conduit, flexible or rigid, through which fluid may flow, such as, but not limited to, garden hose, water system supply lines, water mains, oil and gas pipelines, compressed air lines, and irrigation pipes and pipelines.

The hydroelectric generator of the present invention provides a pre-sealed, watertight device in which the turbine rotor, or portions thereof, is magnetized so as acting as the induction magnets. Herein, the terms "turbine rotor" and "rotor" may be used interchangeably and refer to a rotatable element whose rotation is actuated by the flow of fluid through the fluid flow passageway in which the rotor is deployed. The rotor is deployed within the main flow passage of the pipeline and thereby sealed within the pipeline, and the induction coils are deployed outside of the pipeline such that the fluid is sealed within the pipeline away from the induction coils. The flow of fluid through the pipeline, therefore, causes rotation of the magnetic rotor and the change in magnetic field caused by such rotation induces a flow of electric current in the induction coil. The rotor may be produced from magnetic material. Alternatively, the rotor may be produced to carry magnets.

The hydroelectric generator may be configured for deployment in any suitable pipeline through which a fluid flows, be it in a liquid state or a gaseous state, and is ideal for use with pipeline-associated systems that include electrical components that may be powered directly by the hydroelectric generator, or components that are powered by rechargeable batteries that may be charged by the hydroelectric generator of the present invention. This is especially beneficial in places where it is impractical, inconvenient or unsafe to provide power from a standard electric power grid. These systems may include, but are not limited to: irrigation systems in which one or more components is powered by the generator of the present invention; remotely readable water and/or gas meters utilizing radio transponders; pipeline flow meters; pneumatic supply lines; leak detectors and domestic sprinkling systems; lighting systems associated with, or in proximity to, pipelines; flow indicators; transformers configured to change the DC current produced by the generator into AC current; and sensors configured to measure characteristics of the fluid such as, but not limited to temperature, pressure, and chemical properties.

The hydroelectric generator of the present invention is relatively small and compact in size. Generally, the generator housing has a length that is less than three times the diameter of the pipe in which the hydroelectric generator is deployed, and preferably less than two times the diameter of the pipe. The generator of the present invention also has fewer parts and is therefore easier to manufacture and simpler to assemble than the devices of prior art.

In its simplest embodiment, the generator of the present invention may be configured with the rotor deployed directly in a common length of pipe with the induction coil deployed on an exterior surface of the length of pipe in proximity to the rotor such that a change in magnetic field caused by rotation of said rotor within the pipeline generates a flow of electric current in said induction coil. In practice, however, the present invention provides a generator housing that includes support structures that support and aid in the deployment of the rotor and the induction coils.

Described herein are four embodiments of the hydroelectric generator of the present invention and seven applications in which the generator of the present invention may be used to benefit. Therefore, the basic principles of the generator will first be discussed with regard to a first preferred embodiment illustrated in FIGS. 1-11, applications that are particularly well suited for the generator of the present invention will be discussed with regard to FIGS. 12-22, and alternative embodiments of the generator of the present invention will be discussed with regard to FIGS. 23-27.

It will be appreciated that wherever and whenever suitable, any of the embodiments of the generator herein described may be associated with any of the applications discuss herein with equal benefit.

Basic Principles and First Preferred Embodiment

Referring now to the drawings, FIG. 1 illustrates the hydroelectric generator 2 of the present invention and the piping 4 and pipe connectors 6 of a typical pipeline. The generator 2 is illustrated here with male threads. It will be appreciated, however, that the generator 2 may also be configured with female threads, or even with a combination of male threads on one end and female threads on the other end. Further, the threads may be configured with both sets of threads turning in the same direction or in opposite directions. This is helpful in retrofit applications where the generator is deployed in an existing pipeline. Alternatively, the threads may be replaced by coupling mechanisms, and most advantageously, quick coupling mechanisms such as those manufactured by Modgal Metal, Ltd under the trade names "Quikhinge"® and "QuikCuop"®.

Figure 2:
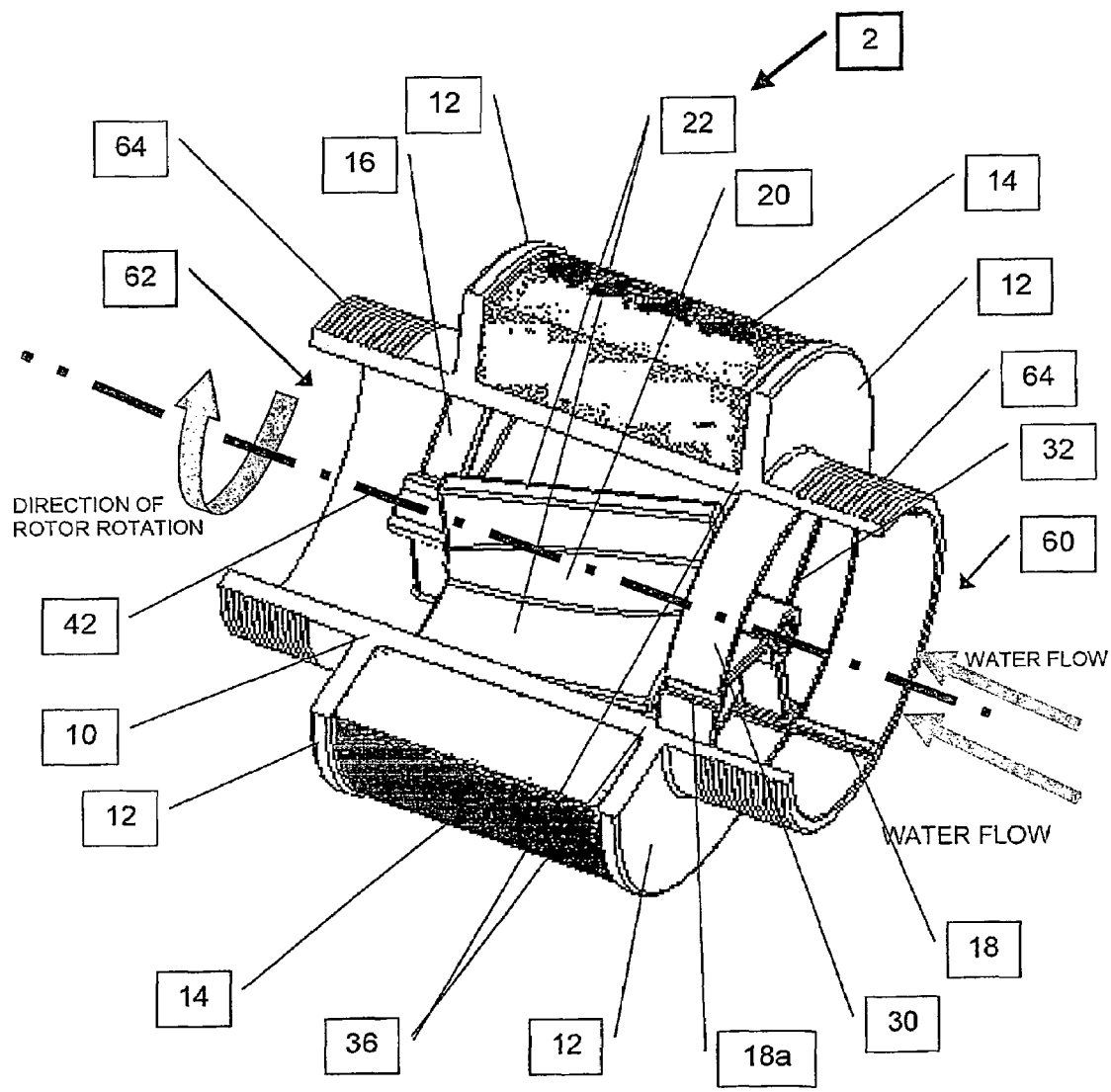
FIG. 2 is a cutaway isometric view of a first preferred embodiment of a hydroelectric generator constructed and operative according to the teachings of the present invention, seen from an upstream angle.

FIG. 2 offers a view of exemplar embodiments of the components of the generator 2. The generator housing 10 is preferably formed as a unitary molded housing. The exterior of the generator housing 10 is configured with flanges 12 that extend substantially perpendicularly from the surface of the generator housing 10. The flanges serve to hold the induction coils 14 on the generator housing 20 and in alignment with the rotor 20 deployed inside the generator housing 10.

The rotor is deployed within the generator housing such that its axis of rotation is substantially parallel to the central axis of the generator housing and therefore, to the fluid flow vector and the central axis of the pipeline, at that point. The rotor 20 is held in place by its axle 20a that engages the axle support bearings 34a and 34 configured in fixed downstream axle support 16 (best seen in FIG. 5) and the upstream axle support 30, respectively. The downstream axle support 16 may be integrally formed with the generator housing 10. Alternatively, the downstream axle support 16 may be formed separately and fixedly, or removably, attached to the generator housing 10.

The upstream axle support 30 is configured to slide into the upstream port 60 of the generator 2 until it abuts shoulder 36, and to engage ribs 18 that correspond to grooves 18a so as to restrict rotational movement of the upstream axle support 30. The upstream axle support 30 may be held in place by, but not limited to, friction fit, a snap lock configuration, a snap ring, ultrasonic welding, the pressure of the fluid flow against it, and in the case of a generator housing 10 with female threads, the abutment of the adjacent length of pipe. It should be noted that the inside diameter of the upstream axle support 30 is substantially the same as the inside diameter of the rest of the flow passage of the generator 2, which is substantially the same as the inside diameter of the pipeline. Therefore, the cross-sectional flow area of the generator flow passage, at substantially any point along the length of the generator, is substantially the same as the cross-sectional flow area of the pipeline. The support fins 32 converge at the axle support bearing 34. The support fins 32 may be configured to direct fluid flow and/or reduce fluid turbulence within the generator 2.

The upstream 60 and downstream 62 ports of the generator housing 10 are configured with attachment pipe threads 64 as mentioned above.

As described above, the rotor 20 may be constructed from material with magnetic properties, thereby allowing the entire rotor 20 to be magnetized as illustrated herein. The rotor may be constructed from, but not limited to, metallic substances, ceramic substances or any other suitable substance. As a non-limiting example, the rotor, or portions thereof, may be injection-molded using a mixture of polymer, such as, but not limited to, polypropylene or nylon, with magnetic powder. Preferably, the mixture is implemented with a majority by weight of magnetic powder, and most preferably, approaching the limit of the maximum proportion of magnetic powder possible while still allowing convenient production techniques such as injection molding. Thus, in one preferred example, a ratio of about 20% by weight polymer to about 80% by weight magnetic powder is used. When produced in this manner, the magnetic material may be magnetized either during or after the injection molding process. Additionally, ceramic powder compression technology may be well suited for manufacturing the rotor 20 when a rotor with magnetic-ceramic properties is desired. Alternatively, rotor 20 may be configured to carry magnets or each individual rotor blade 22 may be configured as a separate magnet. In a further alternative embodiment, the rotor may include a circumferentially encasing cylinder that may include magnets, or the cylinder itself may be magnetized.

Figures 7, 8:
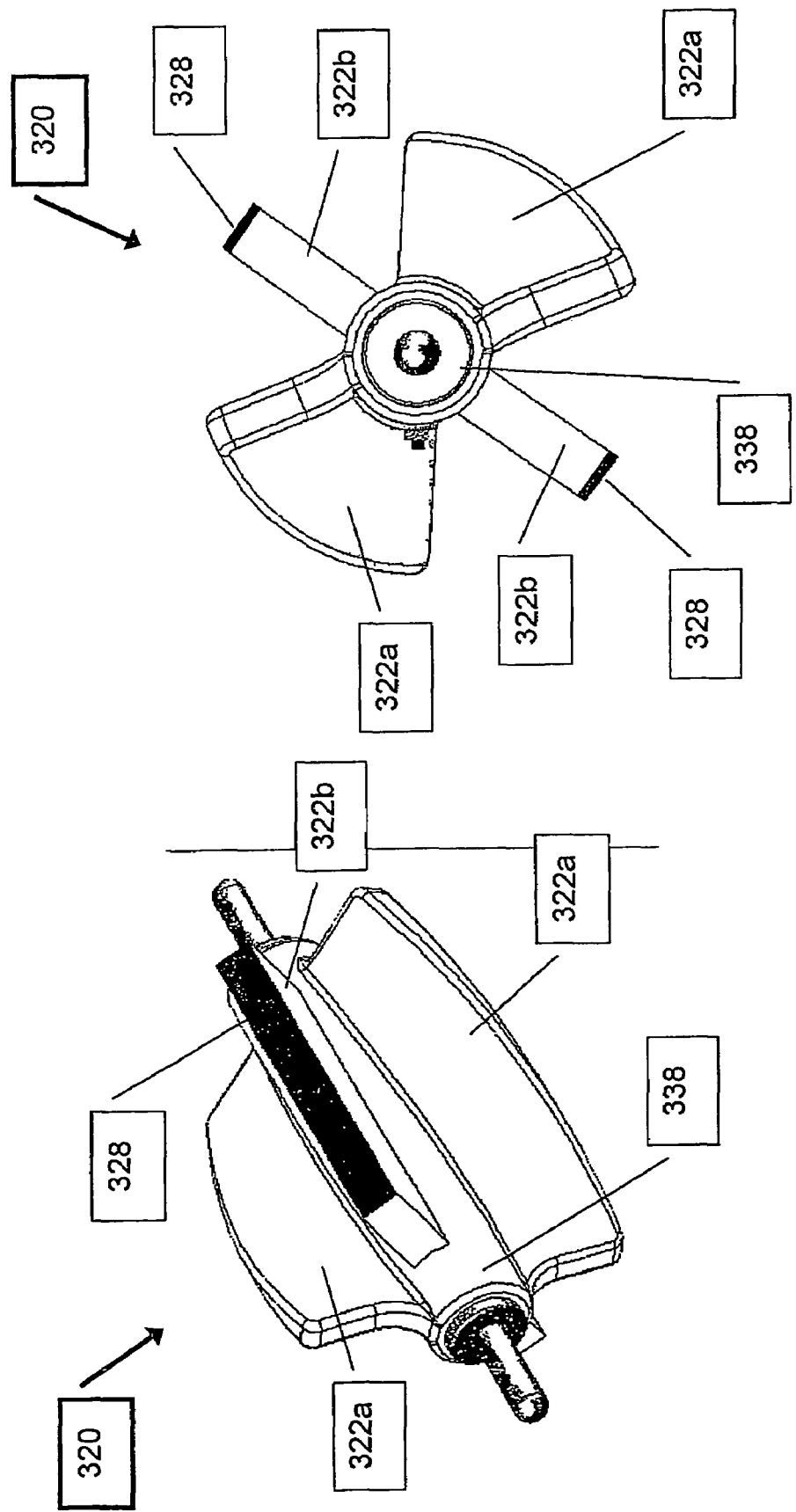
FIG. 7 is an isometric view of an alternative embodiment of a rotor constructed and operative according to the teachings of the present invention.
FIG. 8 is a front elevation of the embodiment of FIG. 7.

As illustrated by the variant rotor 320 shown in FIGS. 7 and 8, it may be desirable to implement certain embodiments using simple low-cost rectangular magnets mounted in a rotor made from low-cost non-magnetic material. These figures show an example in which a number of the rotor blades 322a are configured at an angle to the rotor's axis of rotation and the fluid flow vector of the pipeline so as to generate rotation of the rotor 320 as fluid passes. Intermediate magnetic elements 322b may be configured substantially parallel to the axis of rotation and the fluid flow vector of the pipeline. The magnetic elements 322b may be implemented entirely as magnets or may be configured to hold magnets 328. In some embodiments, magnetic elements 322b may be implemented as a single bar magnet that is inserted through a slot provided in the rotor axle 338.

The induction coil assembly 14 deployed on the exterior surface of the generator housing 10 may be arranged in any suitable configuration known in the art such that the rotation of rotor 20 within the generator housing will induce electrical current flow in the induction coils. It should be noted that the generator housing 10 is preferably constructed from injection-molded plastic, which is invisible to the magnetic field of the generator.

Figure 9C:
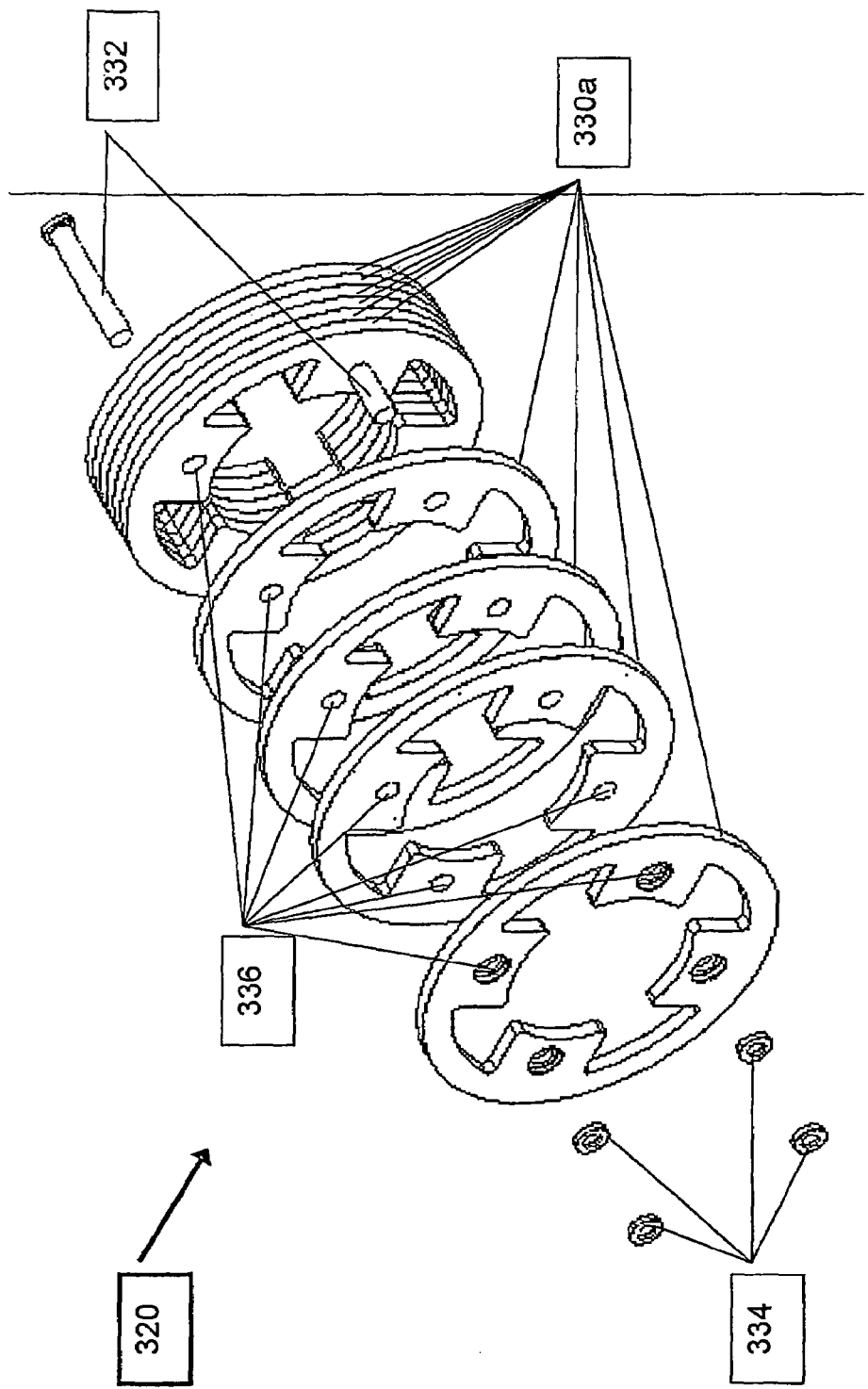
FIG. 9C is an exploded view of the embodiment of FIG. 9A.

The induction coil assembly includes a ferromagnetic core. The core may be constructed as illustrated in FIGS. 9A-9C, where the core 330 is constructed from a number of injection-molded plates 330a. The plates 330a may be injection molded using a mixture of polymer, such as, but not limited to, polypropylene or nylon, and ferromagnetic material, such as, but not limited to, iron powder. Preferably, the mixture is at a ratio of 20% polymer and 80% ferromagnetic powder. In the example illustrated here, ten plates 330a each having a thickness of about 2-3 mm, are assembled using pins 332, which are deployed in through-bores 336 formed in the plates 330a, and washers 334. In certain cases, the pins 332 and washers 334 may be constructed from non-magnetic material such as, but not limited to, acetal and ABS. The pins 332 and washers 334 are fixedly attached by any suitable method known in the art, preferably by ultrasonic welding. It will be appreciated, however, that the plates 330a may be constructed having any suitable thickness, and that the plates 330a may be held together so as to form a core by any suitable method using any suitable known attachment devices. Alternatively, the plates may be constructed from any suitable ferromagnetic metal. As a further alternative, the core may be constructed as a single block of ferromagnetic material, which may be produced by injection molding using the mixtures discussed above.

Figures 10, 11:
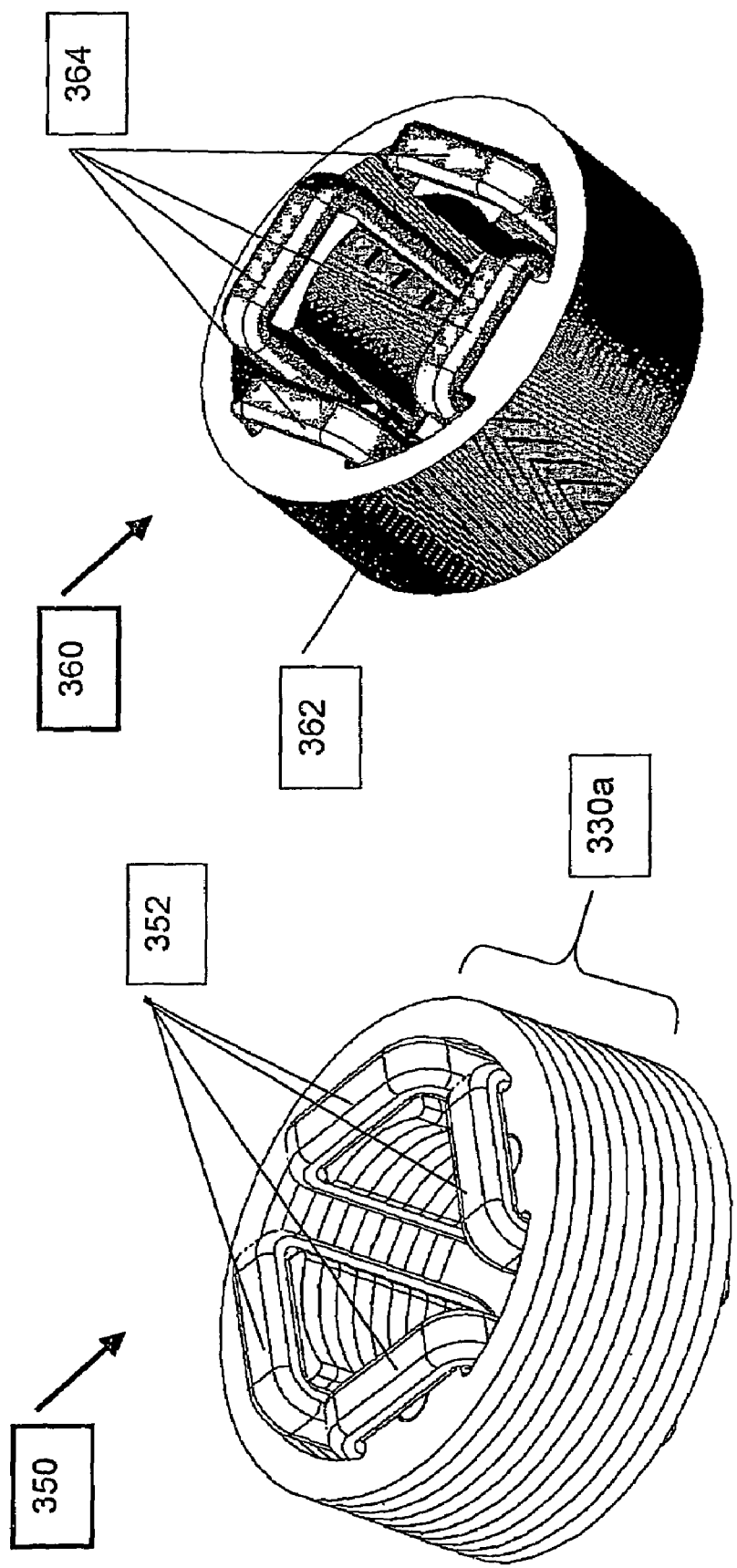
FIG. 10 is an isometric view of an induction coil assembly of the embodiment of FIG. 2 constructed from a plurality of plates.
FIG. 11 is an isometric view of an induction coil assembly of the embodiment of FIG. 2 constructed from a block of ferromagnetic material.

FIG. 10 illustrates an induction coil assembly 350 constructed with a plurality of plates 330a, as described above, and four induction coils 352. FIG. 11 illustrates an induction coil assembly 360 constructed with a single block of ferromagnetic material 362, as described above, and four induction coils 364. It should be noted that the number of inductin coils may be varied as required.

Figure 3:
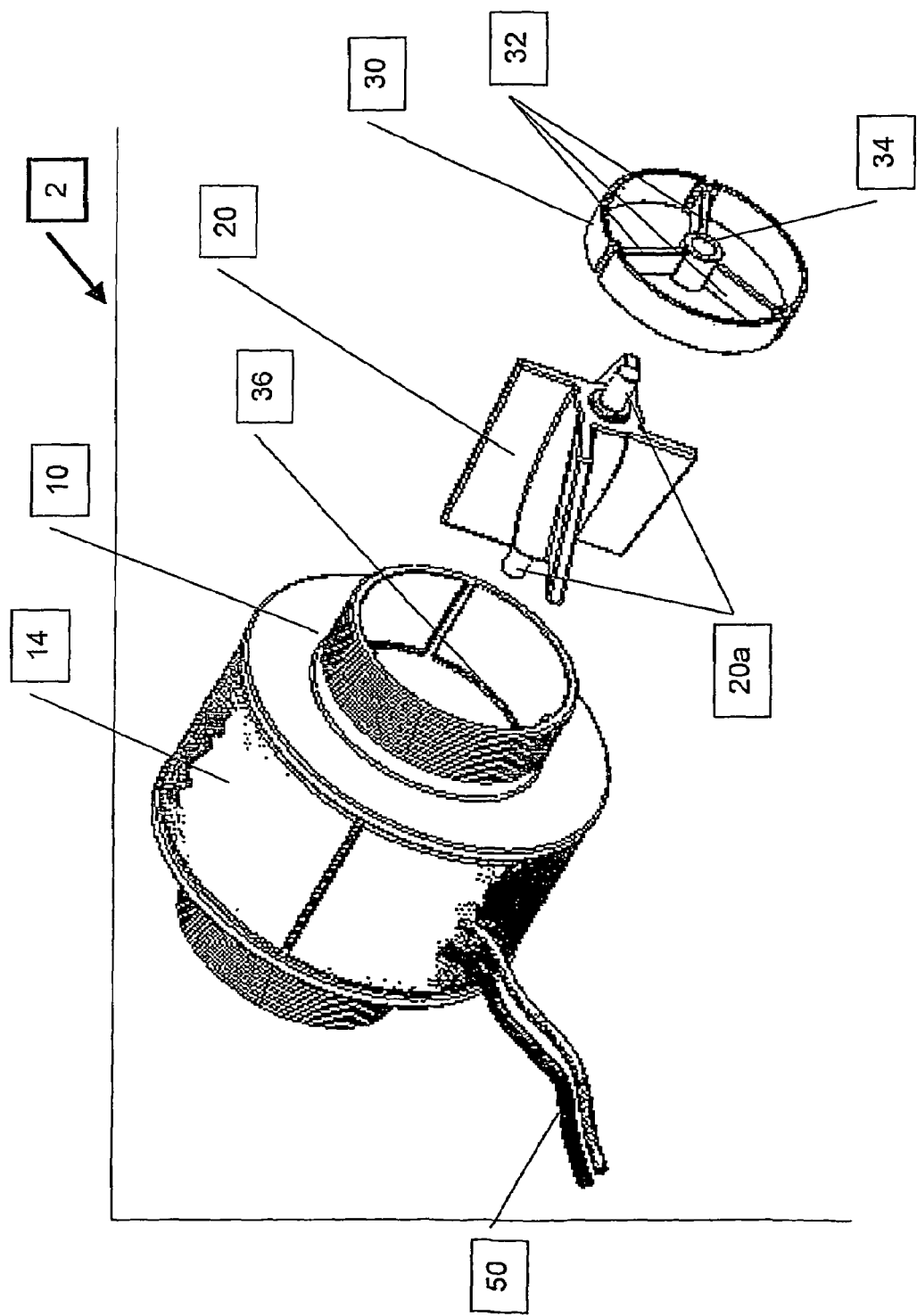
FIG. 3 is an exploded view of the hydroelectric generator of FIG. 2.
Figure 4:
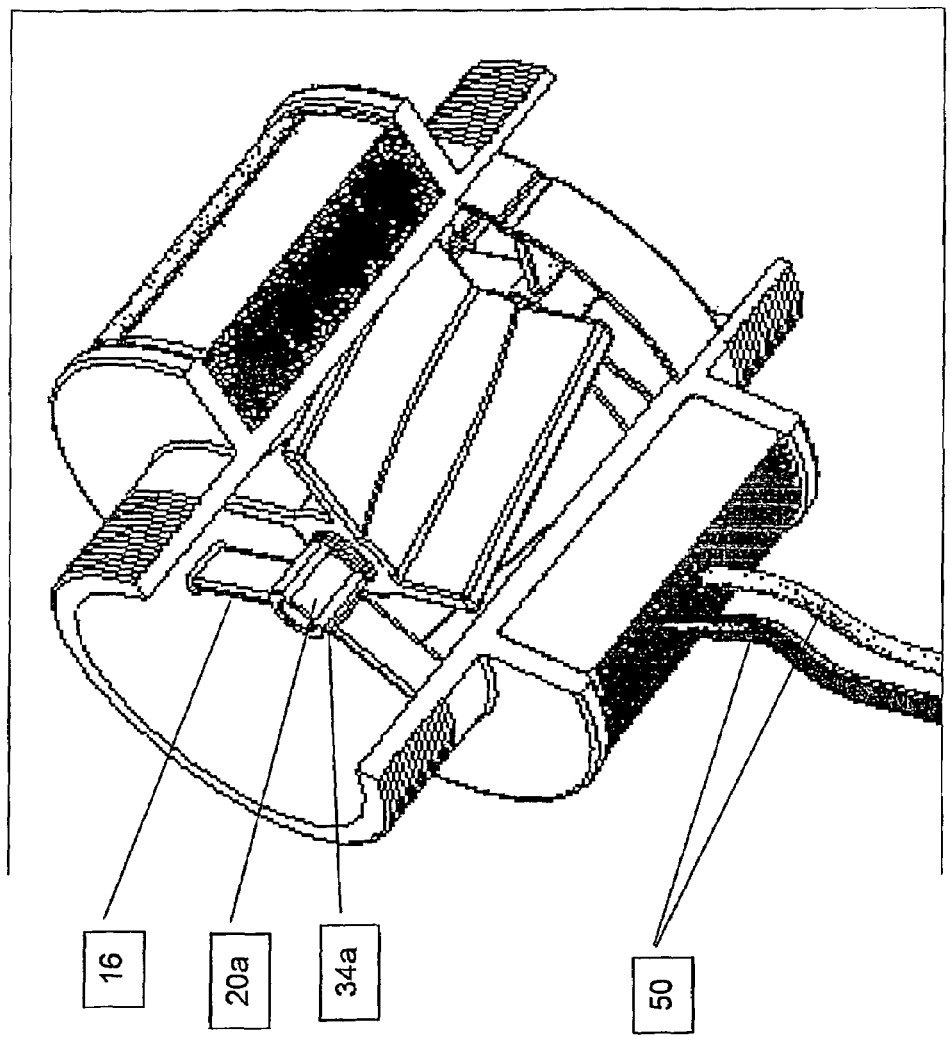
FIG. 4 is a cutaway isometric view of the embodiment of FIG. 2 seen from a downstream angle.

The exploded view of the hydroelectric generator 2 of FIG. 3 serves to illustrate the simplicity of the present invention. Illustrated here are the four basic components of the generator, excluding the lead wires 50. They are the generator housing 10 and induction coil assembly 14, shown here as a single unit with the induction coil assembly 14 installed on the generator housing 10, the rotor 20 and the upstream axle support 30. This simplicity, and particularly the fact that no electric contacts need to pass within the fluid flow path, provides an advantage over the prior art both during manufacture and in service and maintenance.

Figure 5:
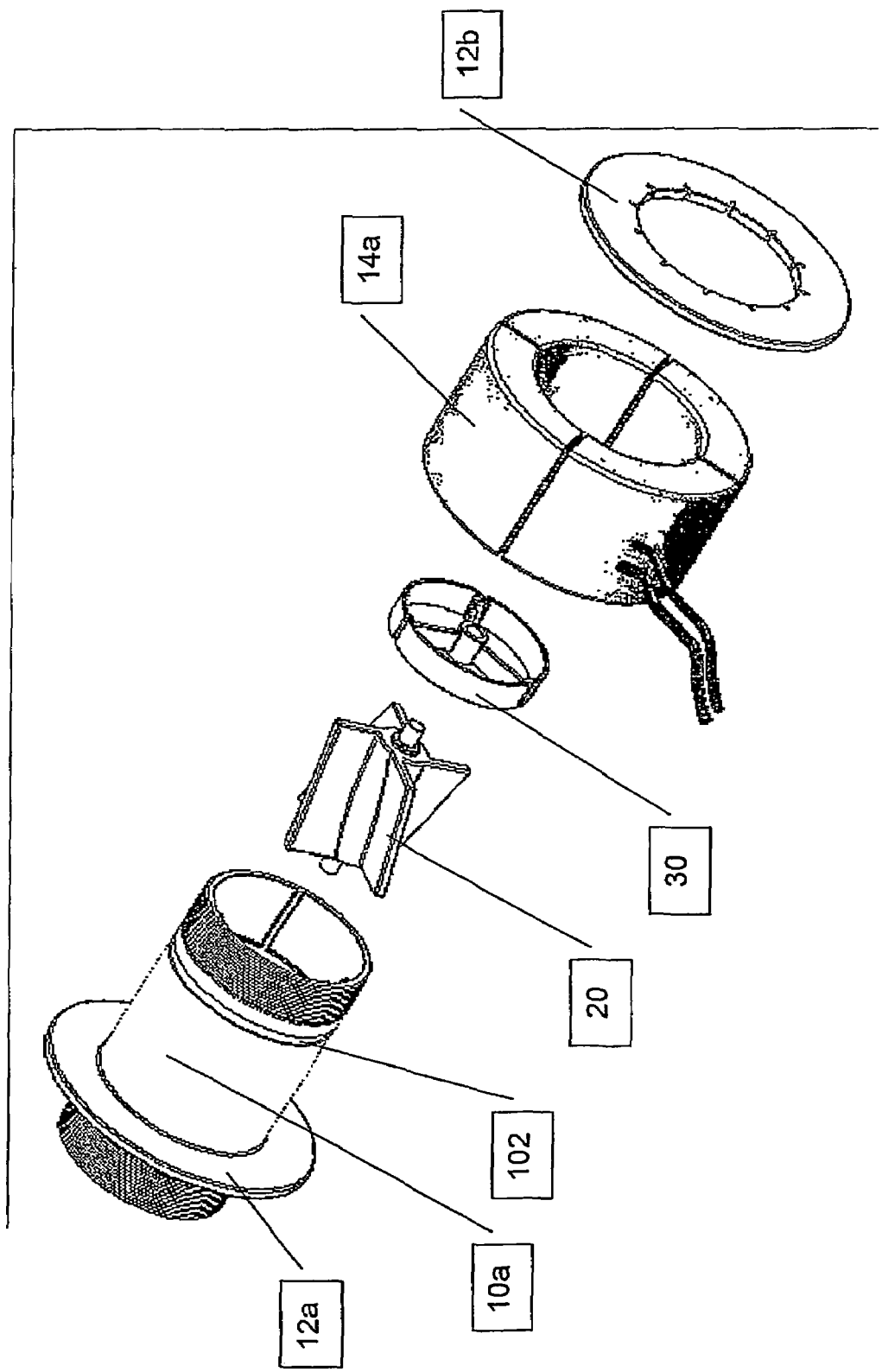
FIG. 5 is an exploded view of a first variant of the embodiment of FIG. 2.
Figure 6:
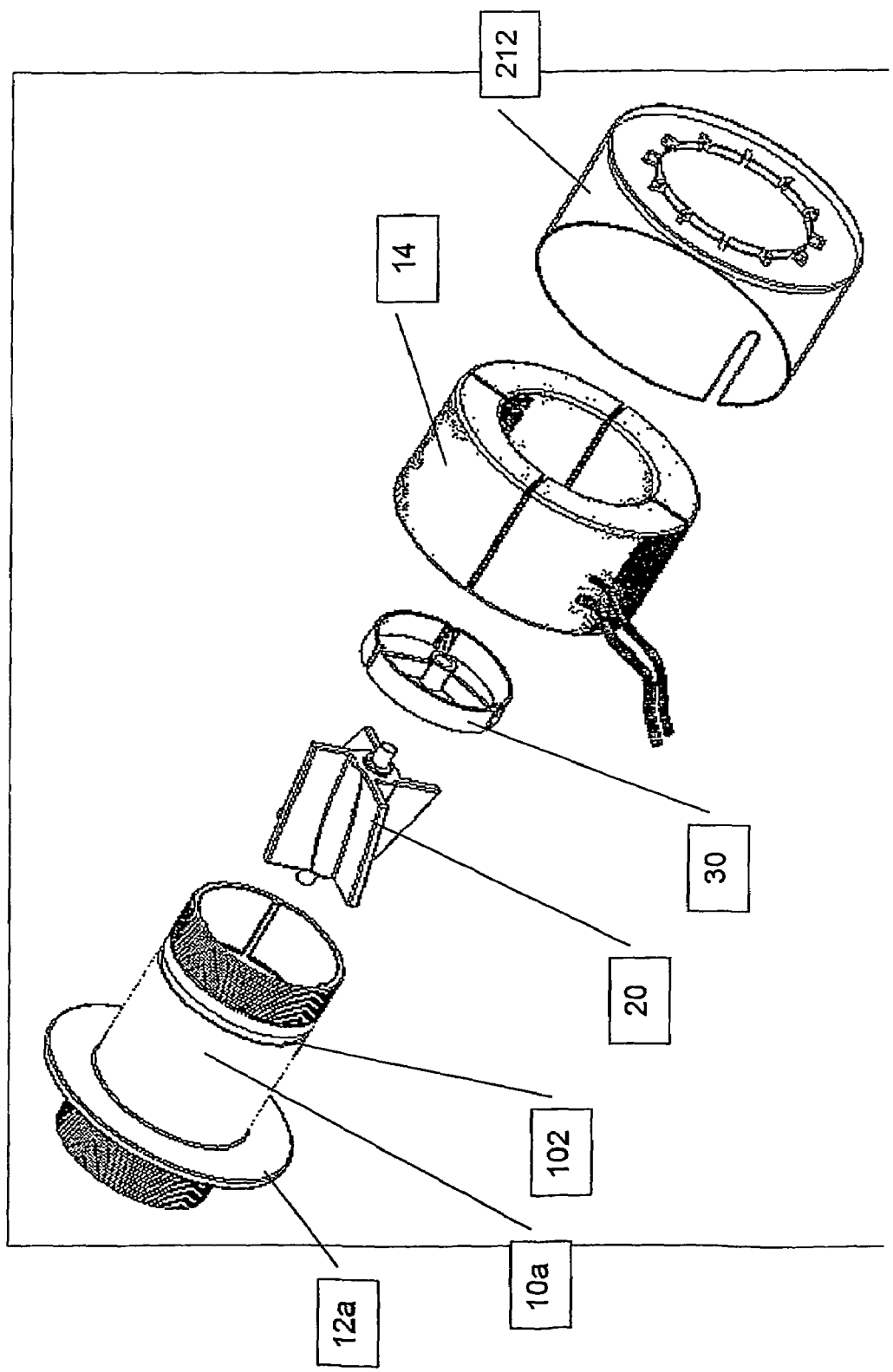
FIG. 6 is an exploded view of a second variant of the embodiment of FIG. 2.

The exploded views shown in FIGS. 5 and 6 serve to further illustrate the simplicity of the present invention, especially with regard to the number of parts and assembly thereof. As illustrated here, the parts include: the generator housing 10a, which is configured with the downstream axle support 16 (not seen) and a single attached flange 12a; a rotor 20; an upstream axle support 30; and induction coil assembly 14a. FIG. 6 illustrates a second flange 12b that is deployed on the housing after the induction coil assembly 14a, and FIG. 7 illustrates a combination flange and coil cover 212.

A method of assembling the generator of FIGS. 5 and 6 may be as follows. The rotor 20 is inserted into the generator housing 10a so as to engage the downstream axle support 16. The rotor 20 is therefore held in place by the upstream axle support 30, while being supported by both the downstream axle support 16 and the upstream axle support 30. The induction coil assembly 14 is then slid over the generator housing until they abut flange 12a. In the case of embodiment 100, flange 12b is then slid onto the generator housing 10a until it engages groove 102 and locks in place. In the case of embodiment 200, the combination flange and coil cover 212 is then slid onto the generator housing 10a until it engages groove 102 and locks in place, thereby enclosing the induction coil assembly 14. It will be appreciated that flange 12a may be integrally formed with the generator housing 10a, or flange 12a may be either fixedly or removably attached to the generator housing 10a. It should be noted that in some embodiments of the present invention, the generator housing may be configured such that the induction coil assembly and any other components such as, but not limited to, batteries, switches, and the like, are enclosed in a watertight casing with only the power output wires extending from the generator housing. Such enclosure may allow for user access to the components. Alternately, the watertight casing may contain no user serviceable parts and may, therefore, be pre-sealed with no user access. It should be noted that at least one wall of the watertight casing may be a portion of the generator housing.

It will be understood that, as mentioned above, the generator of the present invention may be the sole source of electric power. Alternatively, the generator of the present invention may be configured to function in conjunction with one or more rechargeable batteries, with either the generator as the primary source of electric power with a battery back-up or with a rechargeable battery as the primary source and the generator of the present invention configured to recharge the battery.

Applications of the Generator of the Present Invention

With this understanding of features of the present invention, specific applications of the present invention will be better appreciated. It will also be appreciated that the generator of the present invention may be configured as the source of electric power in a variety of applications. There follow a small number of non-limiting examples of applications which are believed to exhibit particular synergy with the generator structures of the present invention.

It should be noted that in some of the applications discussed herein, the combination of the generator and the accessory elements may require an extended generator housing. Therefore, the term "generator housing" is used herein to refer to a unitary component that extends between the inlet port and the outlet port of the device. Further, the generator housing may have components deployed within its interior and/or deployed on its exterior.

Figures 12, 13:
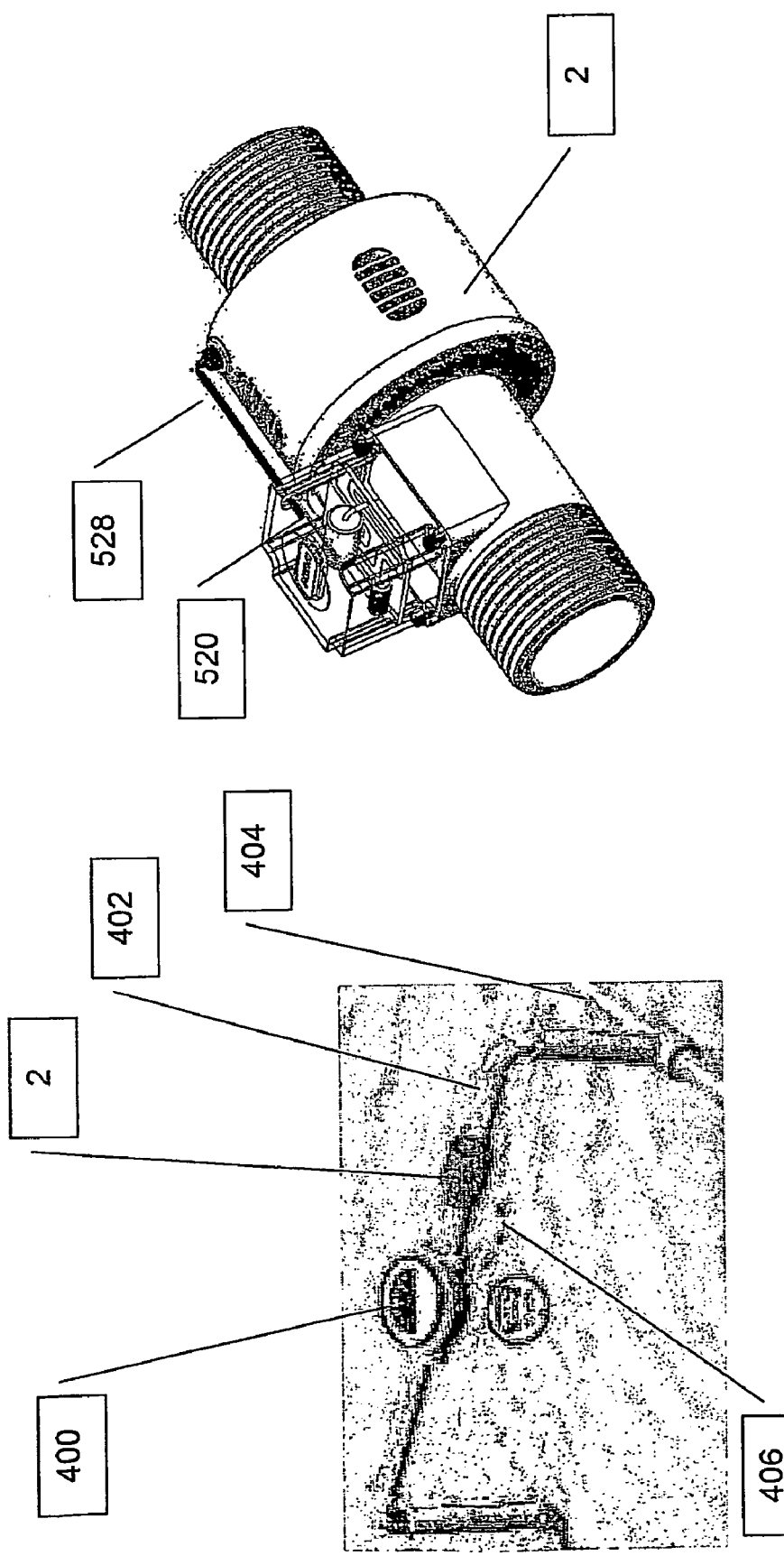
FIG. 12 is a schematic isometric view of a hydroelectric generator of the present invention associated with a remotely readable volume flow meter.
FIG. 13 is an isometric view of a generator of the present invention with an integral volume flow meter.

As illustrated in FIG. 12, volume flow meters such as water meter 400, for example, that have deployed within their housings electronic components, such as, but not limited to, control circuits, memory chips, radio transponders for communication with remote meter-reading devices, LCD displays, and LED displays, may be powered by the generator 2 of the present invention by the electrical connection of the generator 2 to the electronic components of the meter. Such electrical connection may be by way of wire 406. Deployment of the generator 2 may be in the branch line 402 either upstream or downstream from meter 400. If a more constant flow of fluid through the generator 2 is required, the generator 2 may be deployed in the main pipeline 404. As used herein, the term "volume flow meter" refers to a device configured to substantially continuously measure a flow of fluid through a pipeline without resetting the counter.

FIG. 13 illustrates an alternative approach, particularly suited to relatively low-precision volume flow meters or re-settable flow meters, where a generator 2 is supplemented with electronic components to itself function as a flow meter. In this case, the electronic components of the flow meter 520 are mounted on the generator housing. In this application, in addition to supplying power for the electronic components of the volume flow meter 520, the output of the generator is itself used as an indication of the rate of flow of fluid through the device, typically by monitoring voltage cycles to count revolutions, thereby allowing flow meter 520 to determine the volume of the fluid flowing through the pipeline in which the device is deployed.

Figure 14:
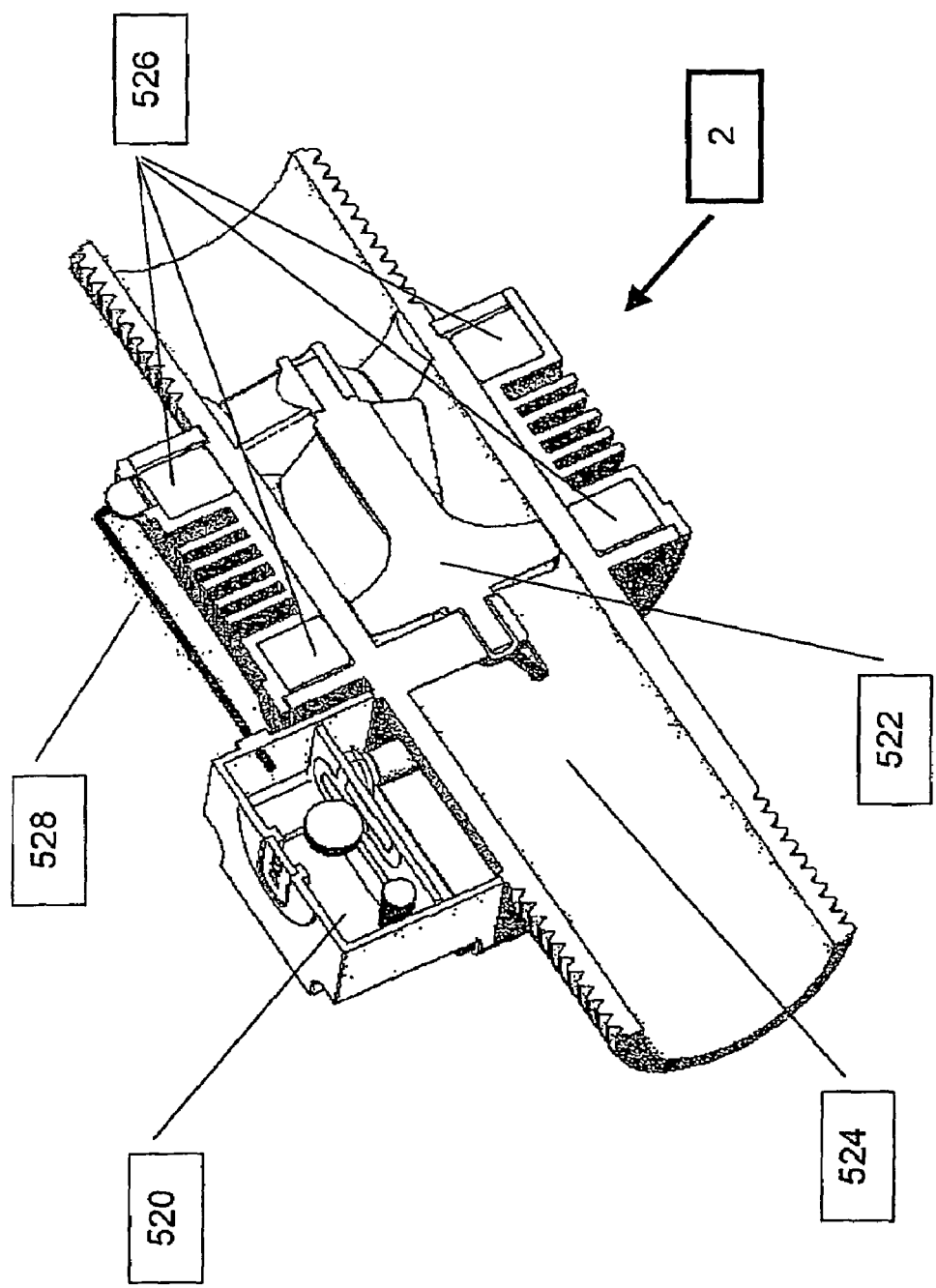
FIG. 14 is an isometric cross section of the device of FIG. 13

As illustrated in FIG. 14, the rotor 522 is deployed inside the generator housing 524 with The induction coil assembly 526 deployed on the outside of the generator housing 524 in alignment with the rotor 522. Power is supplied to the volume flow meter 520 by wire 528.

It will be noted that the electronics of flow meter 520 can be further supplemented to perform additional functions based upon the flow measurements. Thus, by way of one non-limiting example, the generator may power the switching on and off of an irrigation system where the switching is performed as a function of the water delivered, as measured by flow meter 520, thus rendering the quantity of water delivered insensitive to variations in supply pressure or the like. Further options of systems incorporating the generator of the present invention with irrigation systems will be discussed further below.

Figure 15:
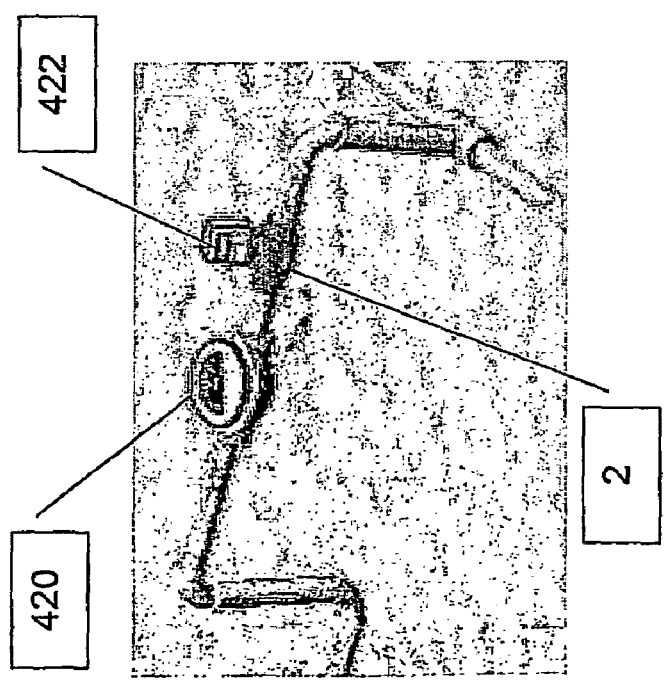
FIG. 15 is a schematic isometric view of a hydroelectric generator of the present invention associated with a flow indicator.

The generator 2 of the present invention may be configured as a fluid flow indicator in which a change in the magnetic field indicates rotation of the rotor, and thus the flow of fluid through the pipeline, as illustrated in FIG. 15. As illustrated here, the generator 2 is being used to power both a volume flow meter 420 and a flow indicator 422. Alternatively, the generator 2 may be the sole source of power for the flow indicator 422, thereby allowing for deployment in a location convenient for monitoring water flow within a house so as to monitor, by non-limiting example, sinks or toilets that have been left running. This would be of particular benefit in large or multi-level homes by providing a centrally located monitor, for example in the kitchen, for all of the water outlets in the house. The flow indicator 422 may be configured to emit an audible or a visual indication of fluid flow either individually or in combination. A non-limiting example of a visual indication may be LEDs in which the number of lights illuminated at any given time is in direct correlation to the flow rate of the fluid flowing through the pipeline. The flow indicator 422 may be configured as a separated unit powered by generator 2. Alternately, the generator may be configured with a flow indicator 422 attached as an integral part of the generator 2.

Figure 16:
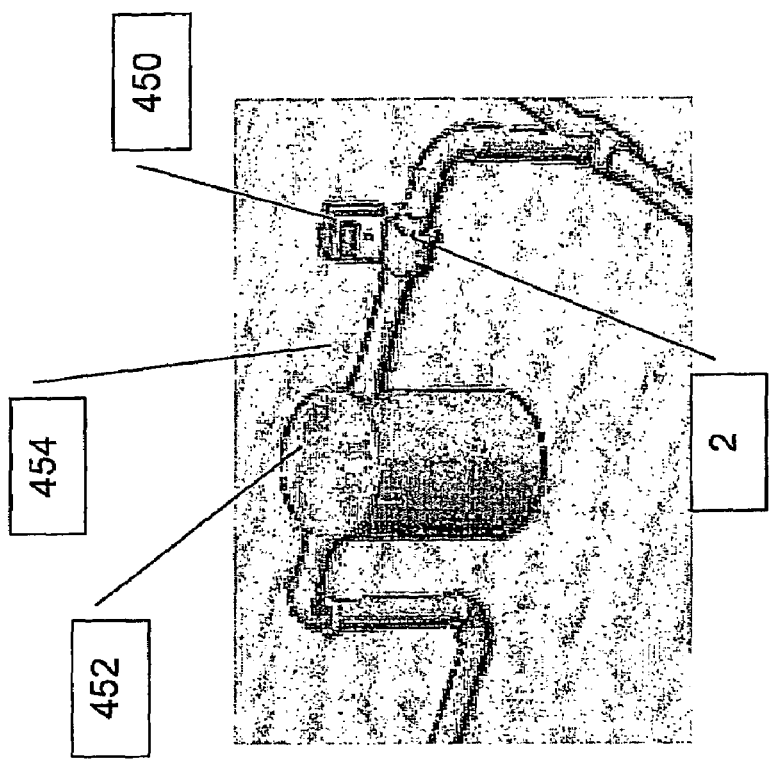
FIG. 16 is a schematic isometric view of a hydroelectric generator of the present invention associated with a flow monitor.

As illustrated in FIG. 16, the generator 2 of the present invention may be associated with a fluid usage meter 450 for devices such as, but not limited to, water filters 452, water softener systems, and compressed air delivery systems, in which it is necessary to periodically change filters based on the amount of fluid that has passed though the filter. As used herein, the term "fluid usage meter" refers to a device that measures the flow of fluid through a pipeline or through a specific device so as to determine when a pre-set volume of fluid has been reached. The generator 2 supplies power to fluid usage monitor 450, which includes a system configured to monitor the amount of fluid passing through the supply pipeline 454 and both trigger and supply power to an alarm, which may be audible or visual, or a combination of both, when a predetermined limit is reached, thereby prompting the user to change the filter 452. In such a system, the amount of fluid passing through the pipeline 454 may be calculated by monitoring the output of the generator 2 in relation to the flow rate necessary to generate such output. Alternatively, the amount of fluid passing through the pipeline 454 may be calculated by monitoring the number of rotor revolutions and the amount of fluid passing through the generator 2 necessary to produce such a number of revolutions.

As illustrated in FIG. 17, the generator 2 of the present invention may be associated with a pipeline leak-detector 470 in which an increase in fluid flow indicative of a leak would also result in an increase in generator output. Such a leak detection device may be configured to light up or generate an electrical signal when there is a continuous slow flow of fluid along the pipeline. Alternately, the leak detector may be configured such that the coils sense the changing magnetic field produced by the slowly rotating rotor, and additional circuitry may be used to activate an alarm indicator. It will be appreciated that the leak detector 470 may be configured as an integral component of the generator housing.

The generator of the present invention may also be used in association with measurement devices configured to measure properties of the fluid flowing through the pipeline. The properties measured may include, but not be limited to, temperature, pressure, and chemical properties.

Within the category of watering systems, there are numerous possible applications such as, but not limited to, providing power to the electronic components of the watering system itself. This may include timers, switches, and communications devices enabling remote control and monitoring of the system as illustrated in FIG. 18. Here, the generator 2 is used to supply power to the irrigation timer system 460, which controls the flow of water through the irrigation pipes 462. This may be accomplished by operating the electronically operated flow control valves 464*a*, 464*b* and 464*c*.

Figure 19:
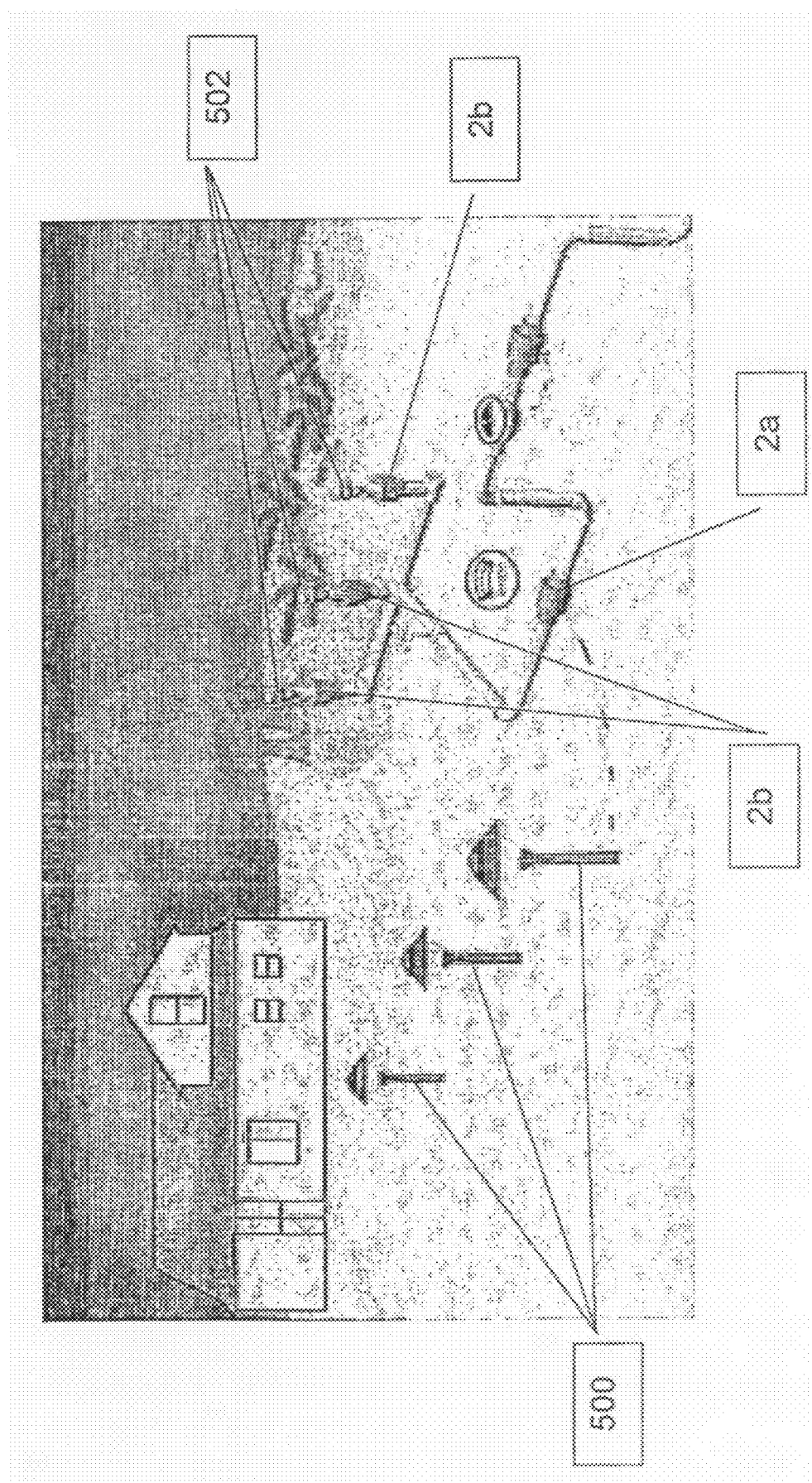
FIG. 19 is a schematic isometric view of a plurality of hydroelectric generators of the present invention associated with a number of lawn and garden lighting systems.

Other applications associated with watering system and illustrated in FIG. 19, may include providing power for garden lighting, which may be either decorative or functional, such as path lights 500, for example, which are remotely powered by generator 2*a*. It should be noted that for lighting applications, since it may be desirable to provide lighting at times when water may not be flowing through the pipeline to which the generator is attached, the generator may be associated with a rechargeable battery such that the rechargeable battery is the primary source of the power for the lights and the generator maintains the charge of the battery. The sprinklers 502 are configured with lights. These may be decorative and/or serve to indicate which sprinklers are currently operating and/or which may be in need of servicing. The sprinkler lights may be powered remotely by a generator that is located upstream. Alternatively, as illustrated here, generator 2*b* is configured with the lighting system pre-attached. It will be understood that an embodiment in which the sprinkler head, lighting system and generator are provided in as a single unit is within the scope of the present invention.

When used in association with lawn and garden applications, the generator of the present invention may be configure as part of a fixed supply line. Alternatively, the generator of the present invention may be configured as a standalone device that maybe attached, for example, to the garden water faucet. Yet another alternative may be a length of garden hose which is configured with a generator of the present invention. In each of these embodiments, the generator may be configured with outlets to enable electrical connection of accessories. In the case of the length of hose, the hose may also be pre-configured with electrical accessories such as, but not limited to, decorative lighting.

Figure 20:
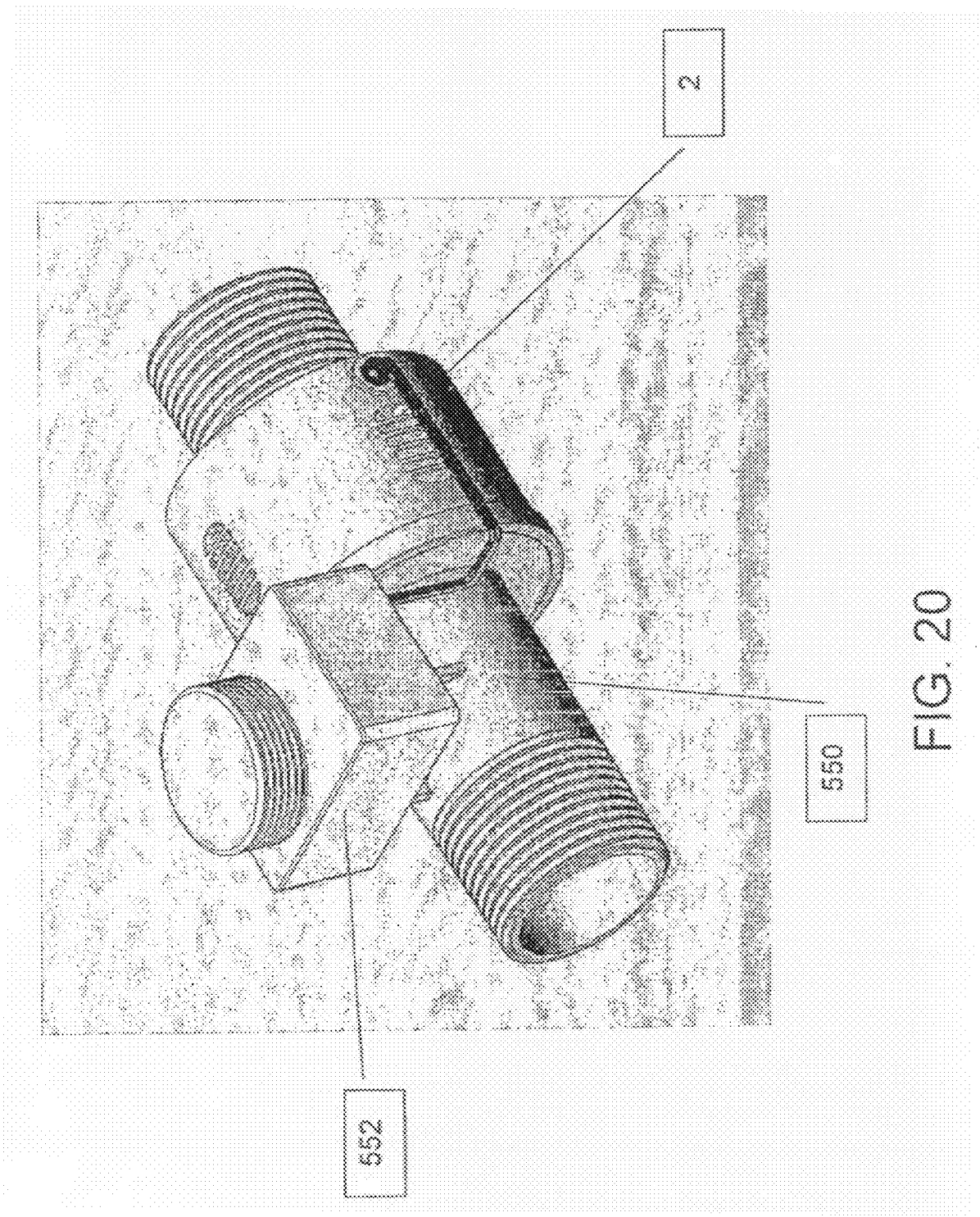
FIG. 20 is an isometric view of a generator of the present invention with an integral flow control system that includes a flow control valve.
Figure 21:
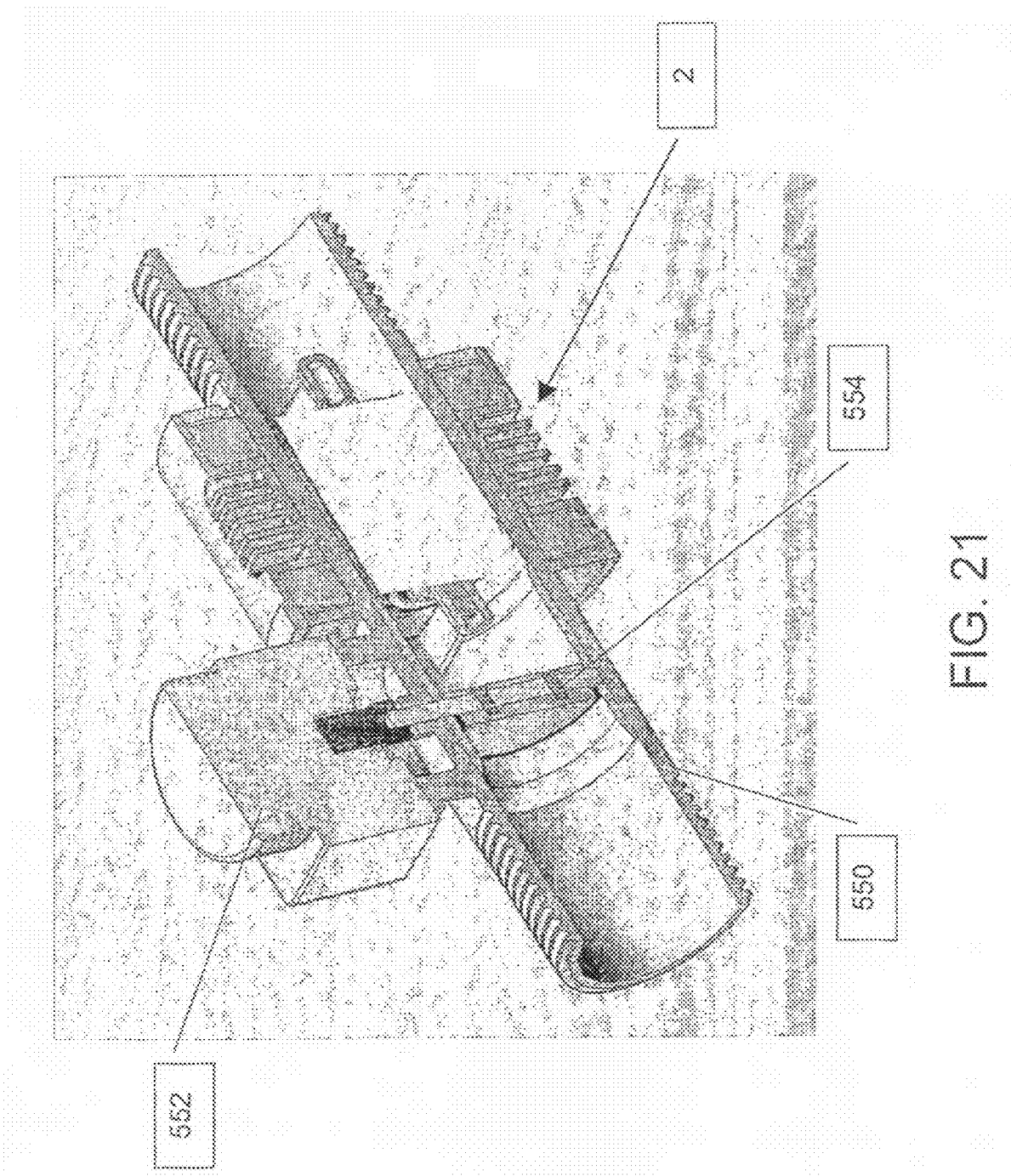
FIGS. 21 and 22 are isometric cross sections of the device of FIG. 20.
Figure 22:
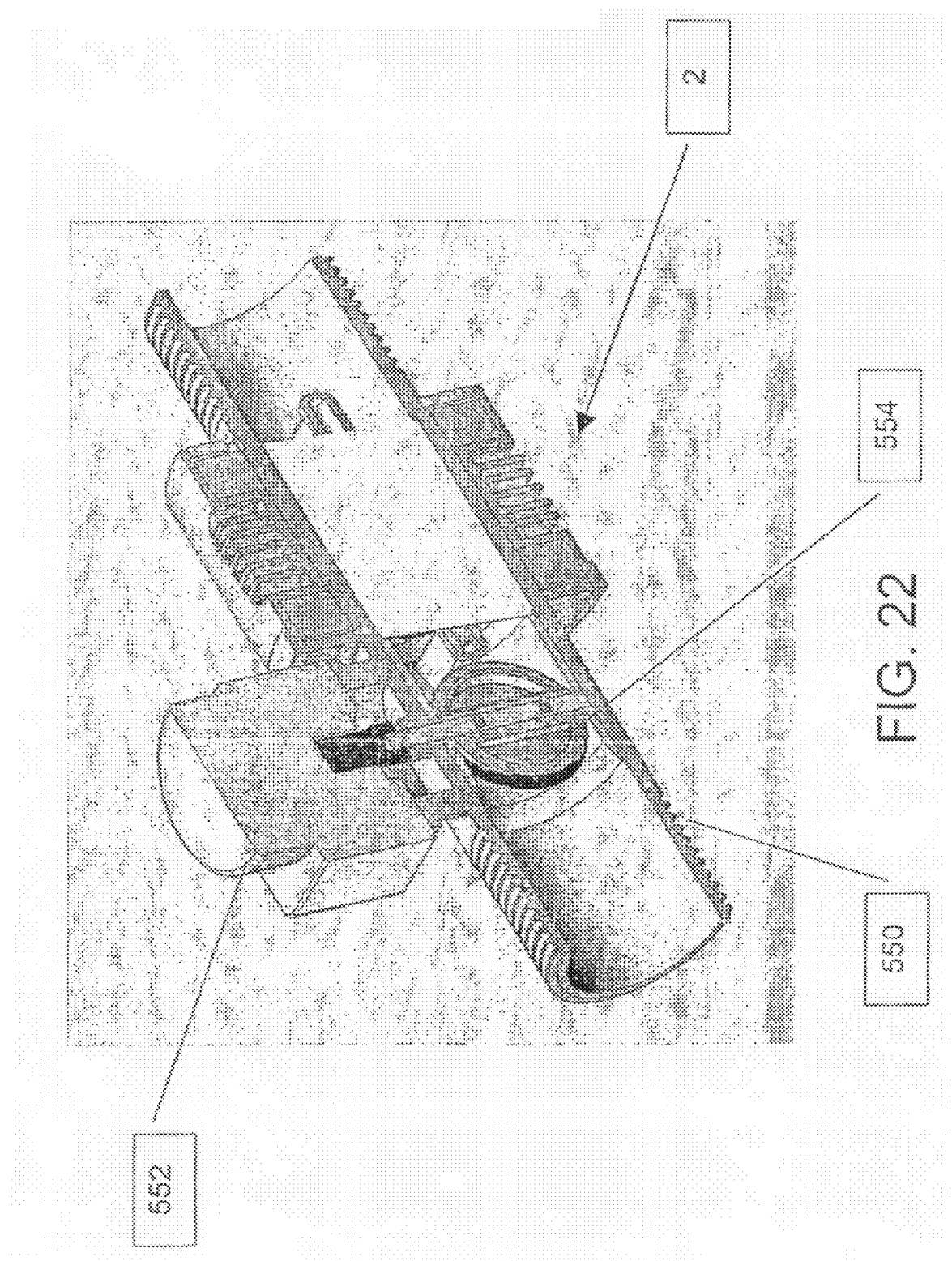

FIGS. 20-22 illustrate yet another application in which the generator of the present invention may be employed. Here, the generator housing 550 that includes generator 2 also includes an integrally mounted automatic flow control system 552 that controls valve 554 shown in a closed position on FIG. 21 and in an open position in FIG. 22. The valve 554 may be configured either upstream or downstream for the generator 2. It should be noted that the use of any known valve configuration now in the art such as, but not limited to, ball valves, diaphragm valves gate valves and flap valves is within the scope of the present invention.

Figure 23:
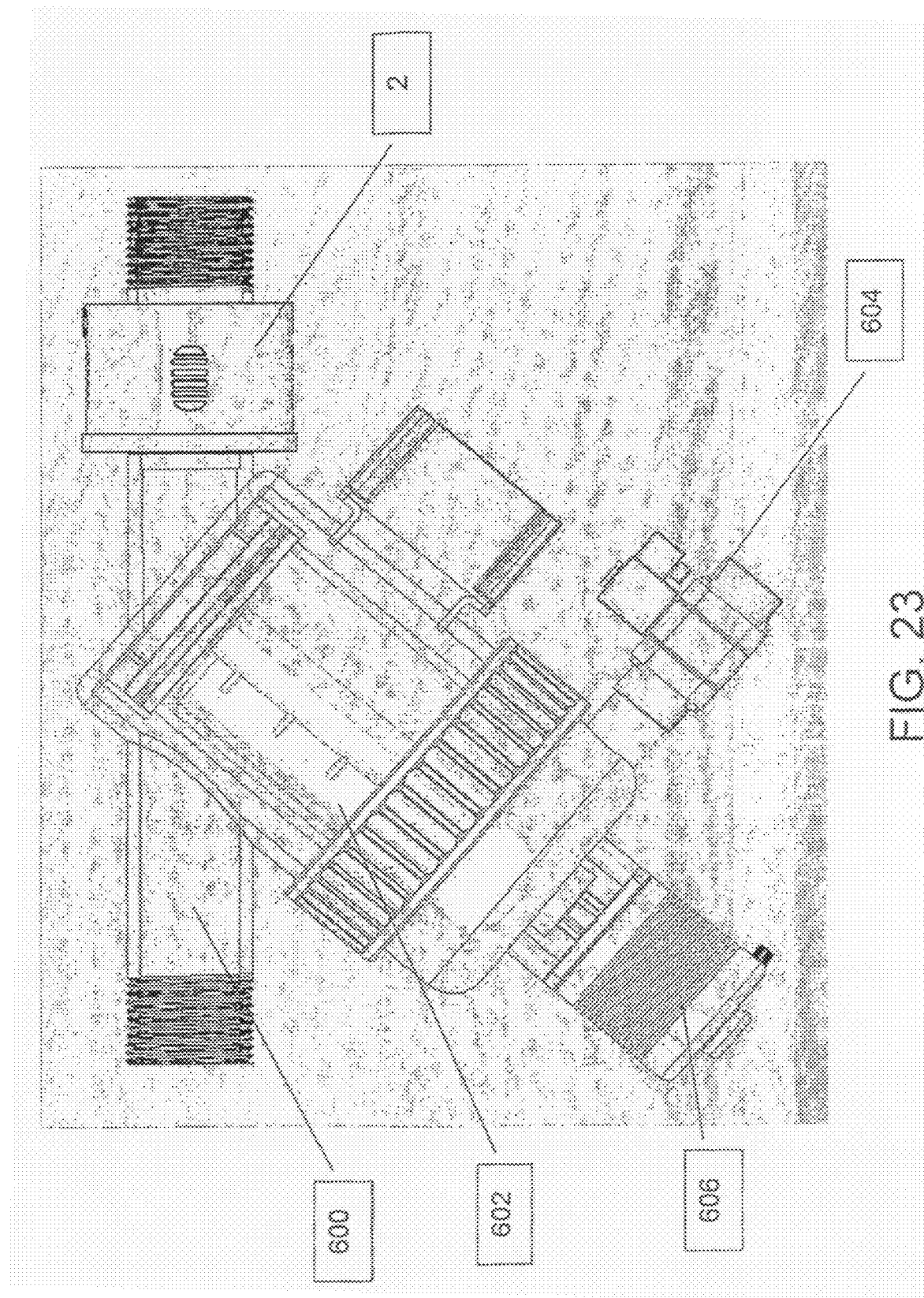
FIG. 23 is an isometric view of a generator of the present invention with an integral self-cleaning water filter.
Figure 24:
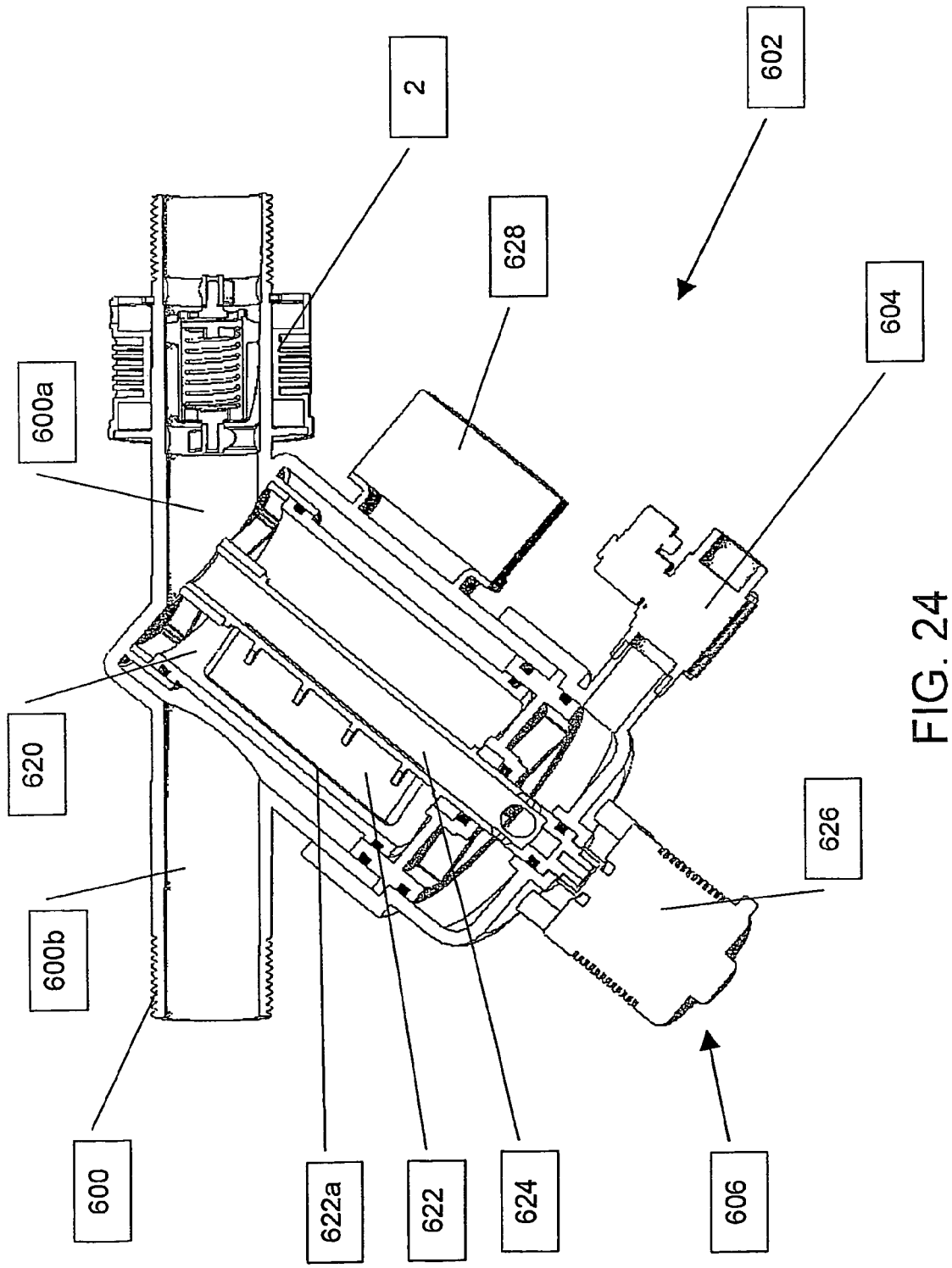
FIG. 24 is a side section of the device of FIG. 22.

FIGS. 23 and 24 illustrate an application in which the generator 2 of the present invention supplies power to the self-cleaning water filter 602 integrally mounted on the generator housing 600. Typical of such filters known in the art, self-cleaning water filter 602 may be configured with an electronics module 628 and a filter cleaning mechanism 606 such that when a pre-set volume of water has flowed through the filter, the filter cleaning mechanism 606 is activated. Alternatively, the filter may include a timer such that the filter cleaning mechanism 606 is activated according to time-based criteria. The electronics module 628 may include a fluid usage meter, other electronic components and a rechargeable battery so as to control the operation of the filter cleaning mechanism 606. The electronics module 628 may be powered by the rechargeable battery solely, or in switchable combination with the generator 2. Preferably all power for the self-cleaning cycle also comes from the generator, either directly or using power stored in the battery.

As illustrated here, fluid following the normal flow path enters the water filter 602 from pipeline portion 600*a* of the generator housing 600, passes through the filter element 620 and returns to pipeline portion 600*b* of the generator housing 600. The filter element 620 may be of the netting type, or any other suitable filter type known in the art. The water filter 602 includes a cylindrical filter element 620. The filter cleaning mechanism 606 is configured with at least one cleaning element 622 that is mounted on a rotating shaft 624, which is driven by motor 626 that is powered either by the generator 2 or by the rechargeable battery of the electronics module 628. The cleaning element 622, illustrated here as a flat vane, is hollow with an open edge 622*a*. During the cleaning process, when the cleanout valve 604 is opened and fluid flows though it, the rapid flow through the hollow center of shaft 624 generates a venturi effect that draws fluid into the open edge 622*a* of the flat vane, creating a filter cleaning flow path. The open edge 622*a* of cleaning element 622 is in close proximity to the inside surface of the filter element 620 and the suction caused by the water being drawn into open edge 622a serves to clean the inside surface of filter element 620. The filter cleaning flow path continues out of the water filter 602 through the cleanout valve 604. During the cleaning process, the rotation of the cleaning element 622 about shaft 624 brings the open edge 622a of the cleaning element 622 into close proximity with inside surface of the entire operative area of filter element 620, thereby cleaning it. It should be noted that the cleaning element may be configured as a tube that travels a complex path in order to clean the entire inside surface of the operative area of the filter.

Alternately, the hollow center of shaft 624 may be configured such that it is closed at the top end. Such closure will eliminate the venturi effect described above. However, the pressure differential from the supply pressure within the filter to the open cleanout valve 604 generates a strong flow into the open edge 622a of the cleaning element 622, and thereby cleaning the inside surface of filter element 620.

It will be appreciated that other types of filters may be used in combination with the generator of the present invention such as, but not limited to, a simple sediment collection filter wherein the opening of a flush valve produces a flush cycle.

The hydroelectric generator of the present invention may also supply electric energy to accessories associated with household water outlet points such as, but not limited to, kitchen, laundry and bathrooms. Bathroom accessories may include, but not be limited to, lighted showerheads and pipes, shower radios and/or clocks, sensor systems configured to monitor and display water temperature. Kitchen and laundry room accessories may include, but not be limited to, faucet or sink associated lighting, and sensor systems configured to monitor and display water temperature and/or pressure. Lighting systems may be configured to be either decorative or functional, or both. In all of the above cases, the use of the generator of the present invention allows implementation of electric or electronic accessories in locations which are exposed to water without requiring any connection to the main electrical grid, thereby greatly enhancing safety. At the same time, use of the generator of the present invention avoids the cost and inconvenience of battery replacement in battery-powered accessories.

The generator of the present invention may also supply power to a control system employing proximity sensors such that any of the devices discussed above may be automatically turned on or off depending on the presence of a user.

It will be readily appreciated that many, if not all, of the embodiments discussed above may also be beneficially used in association with pipelines in which the material flowing through the pipeline is in a gaseous state, both pressurized and non-pressurized, or in a solid state, such as, but not limited to, powders, granules and pellets. A list of such applications may include, but should not be limited to, flow indicators, measurement devices configured to measure properties of the material flowing through the pipeline, leak-indicators, and lighting systems.

It will be understood that the adaptation of any of the above mentioned devices so as to include a generator of the present invention as in integral part of the device such as the sprinkler system mentioned in regard to FIG. 18 or the water meter with an integral generator system of FIGS. 13 and 14, as non-limiting examples, is within the scope of the present invention.

Further Embodiments of the Generator of the Present Invention

It will be understood that any of the embodiments described here below may by used in substantially any of the applications discussed above by replacing generator 2 of the first preferred embodiment.

FIG. 24 illustrates a second preferred embodiment of the generator 700 of the present invention in which the rotor 702 is configured with a substantially cylindrical wall 704 that is spaced apart from and circumscribes the central axle 706 of the rotor 702 with the rotor blades 708 extend outwardly from the cylindrical wall 704. This configuration creates a fluid flow path that circumscribes the cylindrical wall, passing across the blades of rotor 702 during times of low flow rate. The reduced cross-sectional area of the flow path ensures sufficient momentum of the fluid flow to displace the rotor even under relatively low flow rate conditions. During times of high flow rate, a flow impedance regulator 710 configured in the interior region 712 defined by the cylindrical wall 704 is forced open to allow the passage of fluid through the interior 712 of the rotor 702, and thereby avoiding excessive pressure drop across the device. As used herein, the term "flow impedance regulator" refers to any element configured to block fluid flow through the interior region defined by the cylindrical wall at low flow rates and allow the passage of fluid through said interior region defined by the cylindrical wall at high flow rates.

Figure 25:
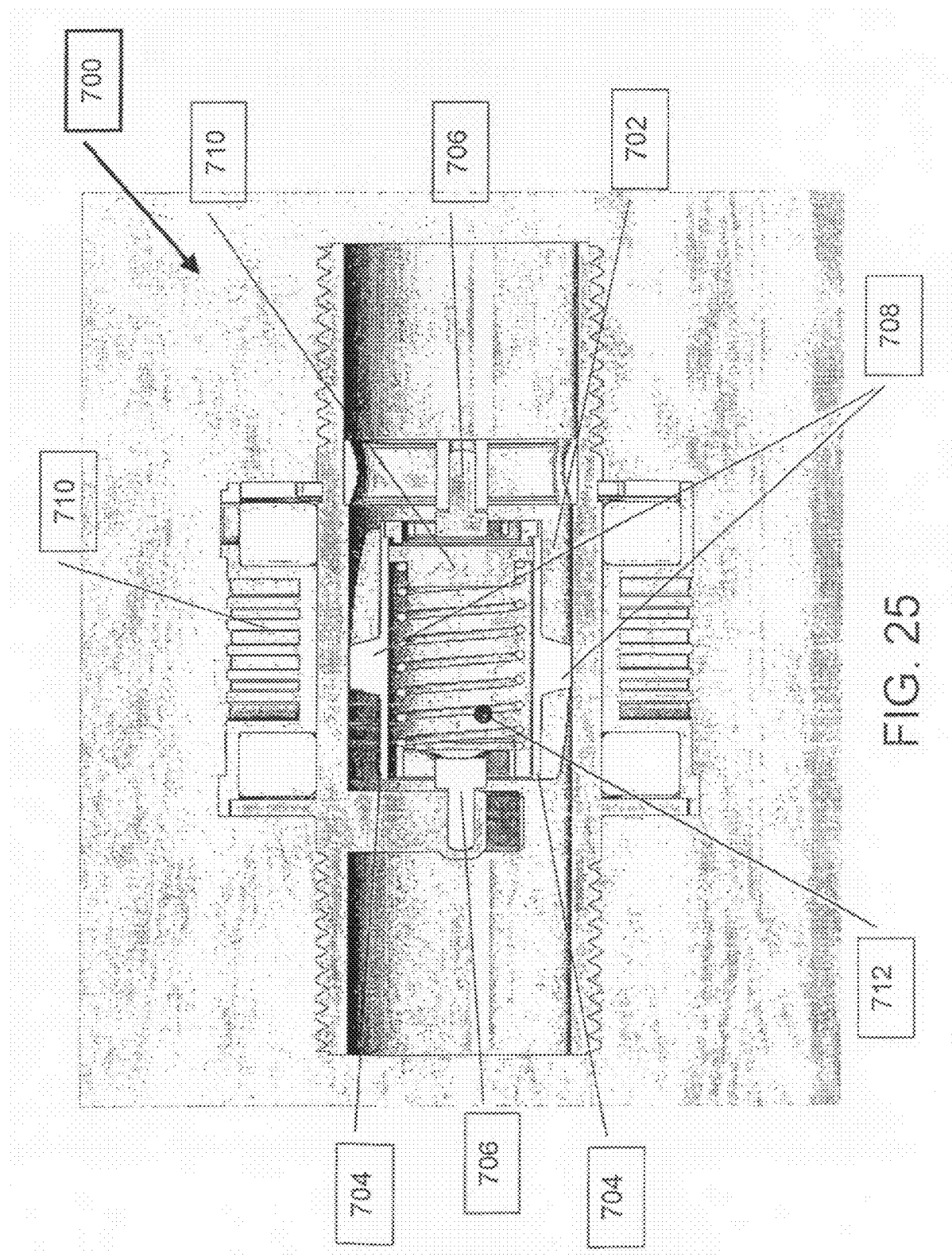
FIG. 25 is a side cross sectional view of a second preferred embodiment of a hydroelectric generator constructed and operative according to the teachings of the present invention.
Figure 26:
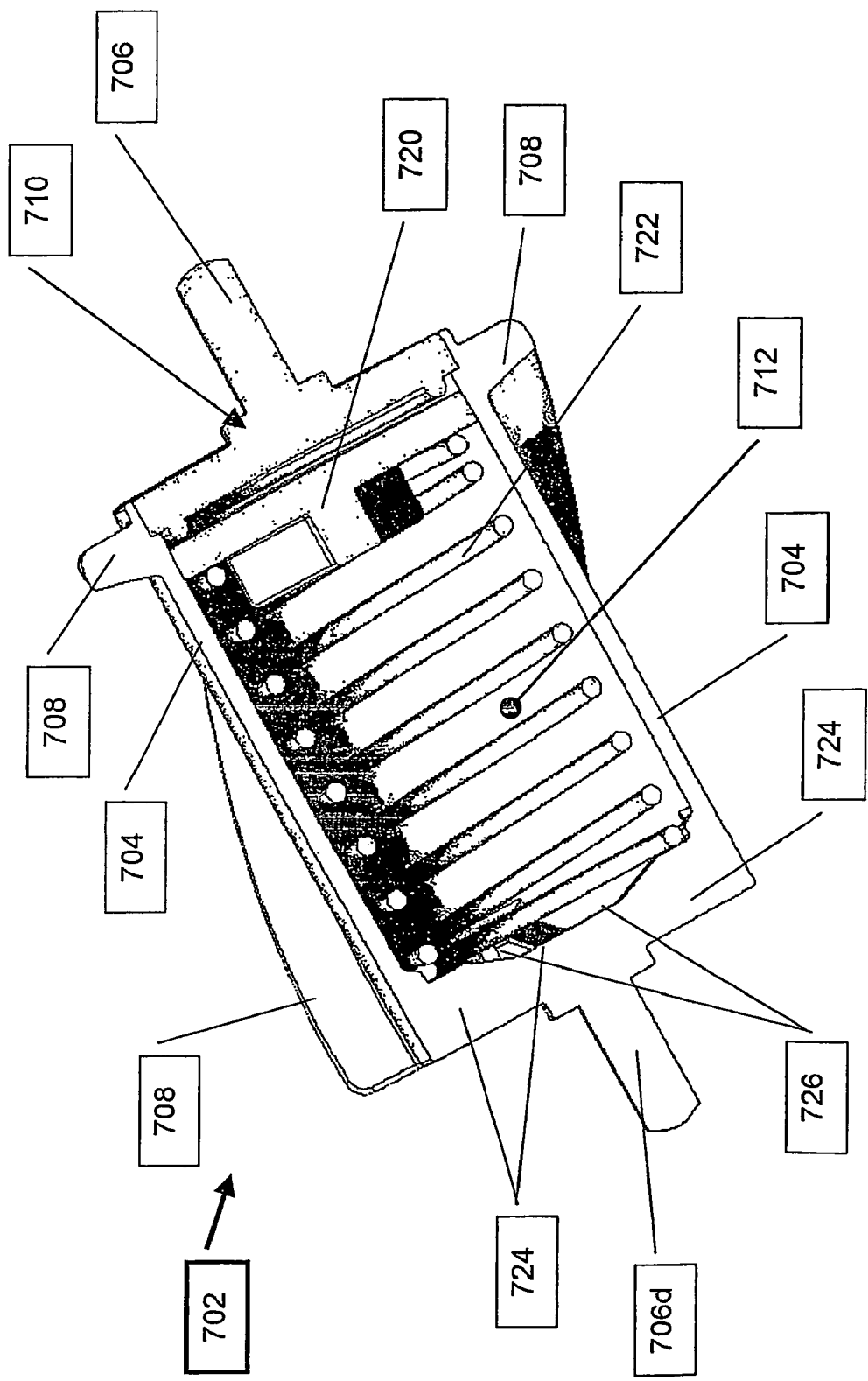
FIG. 26 is a side section of the rotor of the embodiment of FIG. 25.

As better illustrated in FIG. 25, the flow impedance regulator 710 configured in rotor 702 includes a valve plug element 720 that is biased to a closed position by spring 722. It should be noted that the down stream end 706d of the central axle 706 is supported by support struts 724 such that fluid flows out of the interior region 712 of the rotor 702 through openings 726 formed between the support struts 724.

Figure 27:
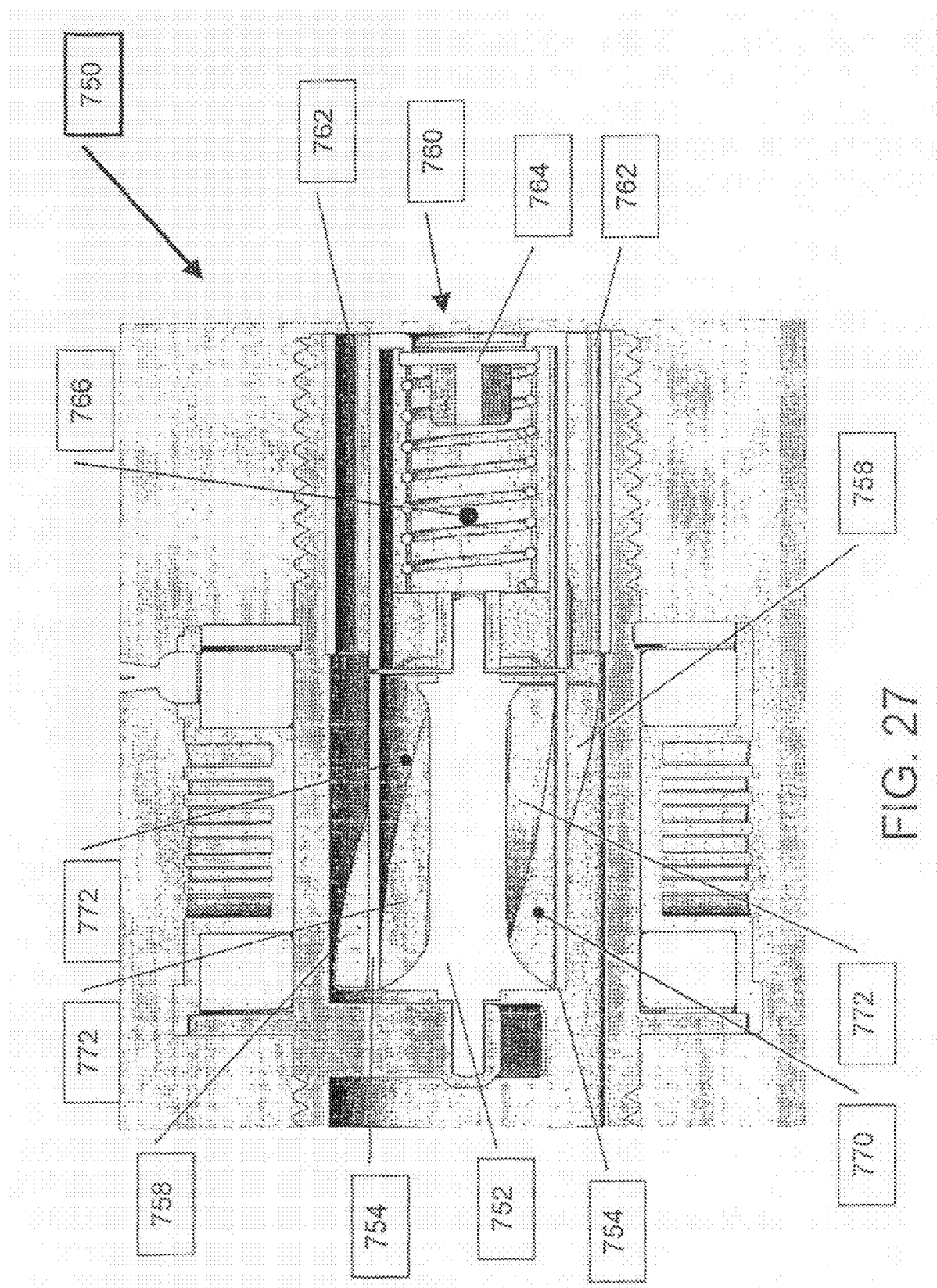
FIG. 27 is a side cross sectional view of a third preferred embodiment of a hydroelectric generator constructed and operative according to the teachings of the present invention.
Figure 28:
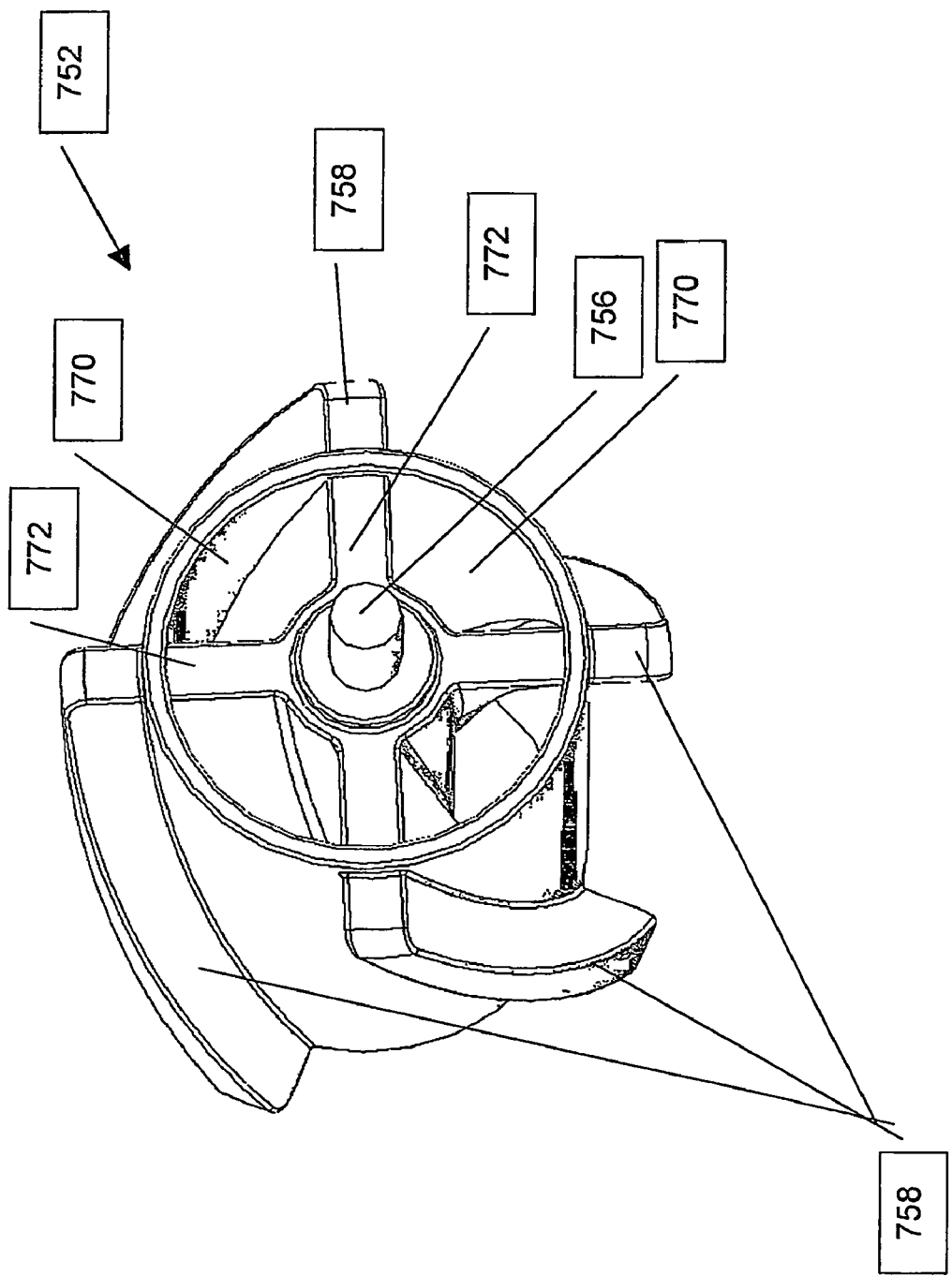
FIG. 28 is an isometric view of the rotor of the embodiment of FIG. 27.
Figure 29:
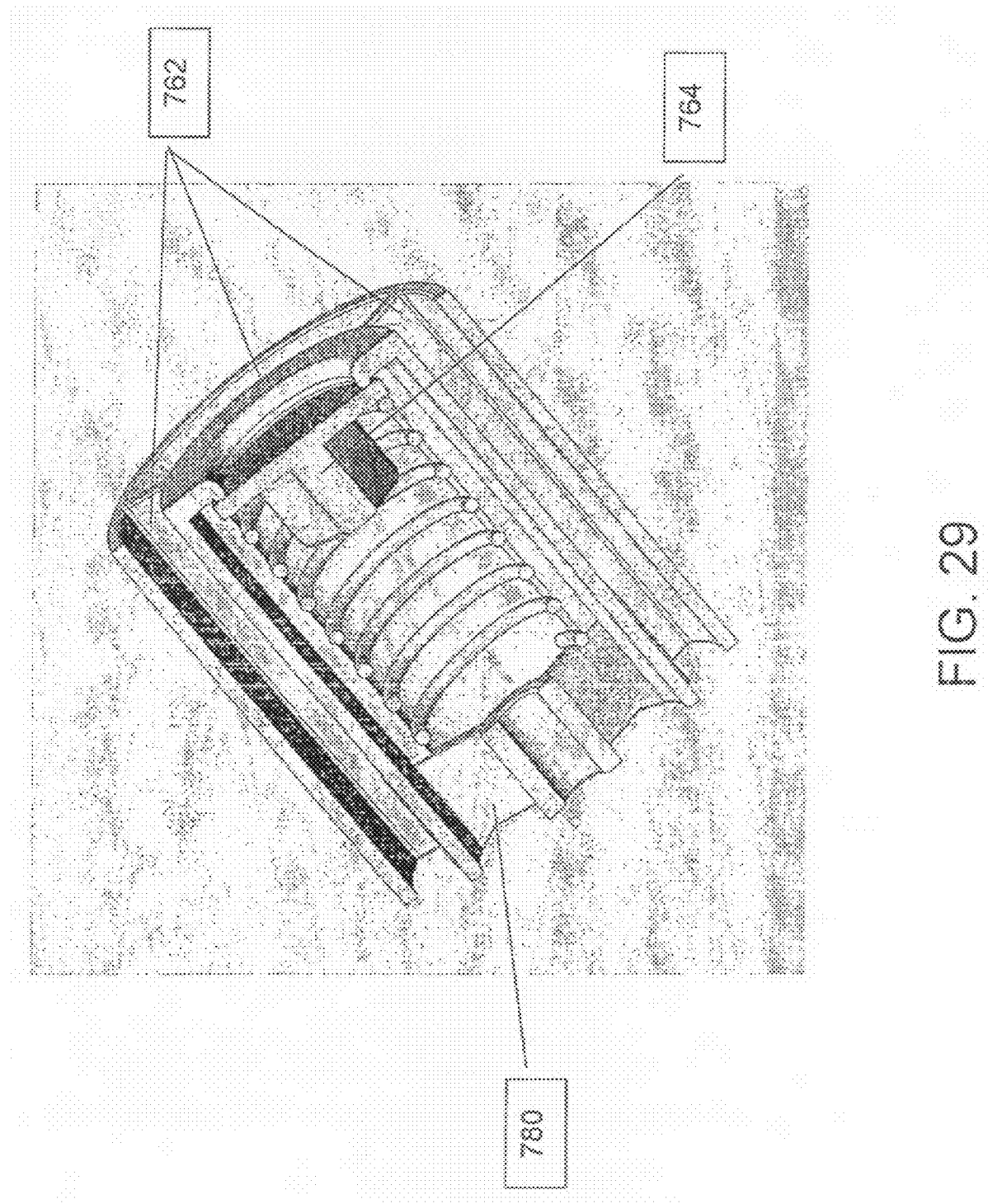
FIG. 29 is an isometric view of the flow directing element of the embodiment of FIG. 27.

FIGS. 27-29 illustrate a third preferred embodiment of the generator 750 of the present invention generally similar to that of FIG. 24, but in which the flow impedance regulator is deployed in series with the rotor structure. Specifically, in this case, the rotor 752 is configured with a substantially cylindrical wall 754 that is spaced apart from and circumscribes the central axle 756 of the rotor 752 with a first group of rotor blades 758 extend outwardly from the cylindrical wall 754. Generator 750 also includes a fluid directing configuration 760 associated with the rotor 752. The fluid directing element 760 is configured to direct the fluid flow path through passageways 762 to the region in which rotor blades 758 are deployed between the cylindrical wall 754 and an interior surface of the pipeline. This configuration creates a fluid flow path that circumscribes the rotor 702 during low flow rate conditions. During high flow rate conditions, a flow impedance regulator 764 configured in the interior region 766 of the fluid directing element 760 is forced to an open position to allow the passage of fluid through the interior 770 of the rotor 752. As shown here, the interior 770 of rotor 752 may be configured with a second group of rotor blades 772.

As seen in FIG. 29, the fluid directing element 760 may include the upstream axle support 780.

Figure 30:
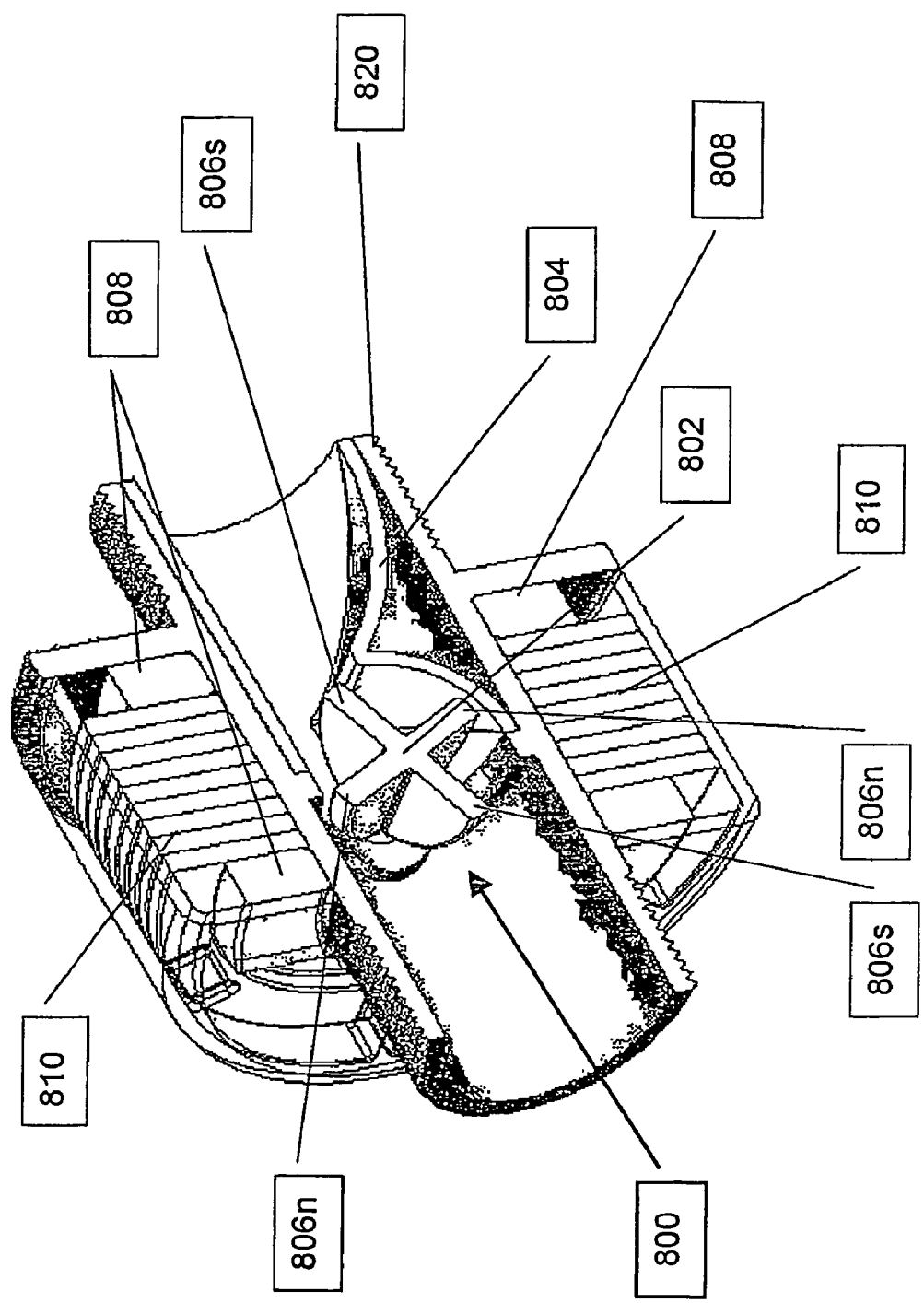
FIG. 30 a side section of a fourth preferred embodiment of the hydroelectric generator constructed and operative according to the teachings of the present invention in which the axis of rotation of the rotor is perpendicular to the central axis of the pipeline.
Figure 31:
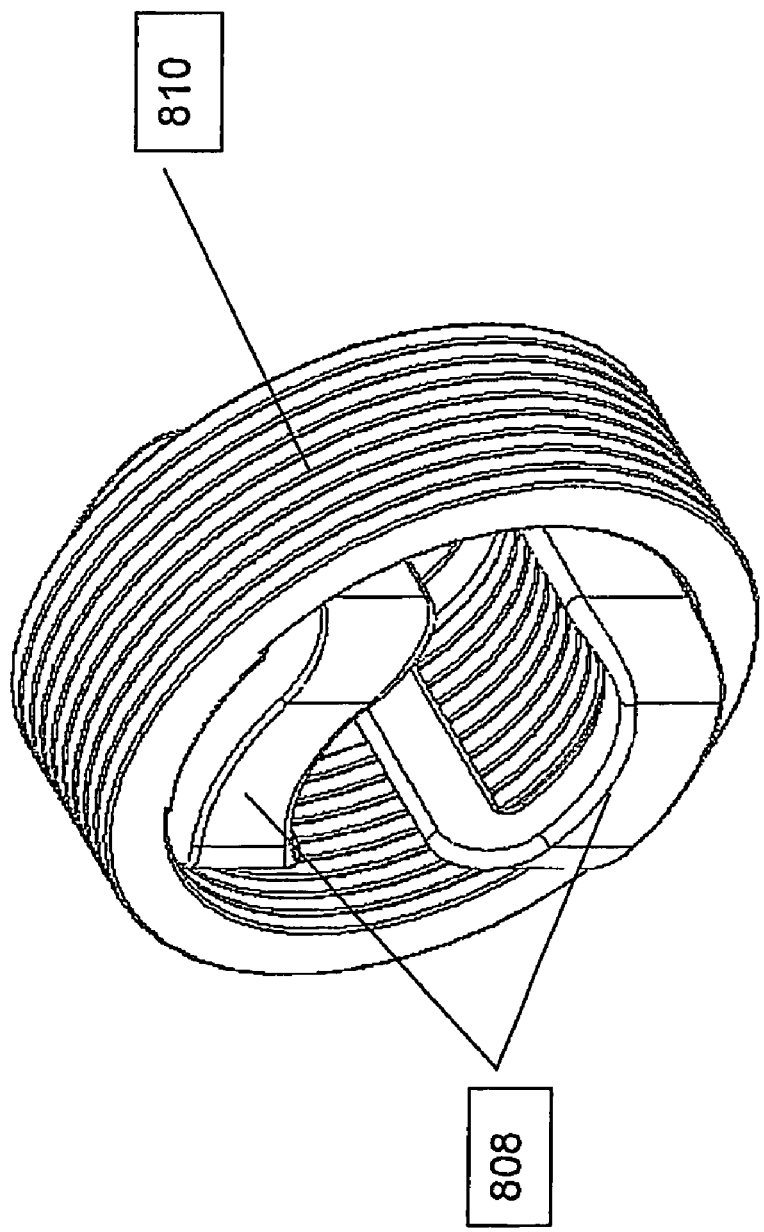
FIG. 31 is an isometric view of an induction coil assembly of the embodiment of FIG. 30 constructed from a plurality of plates.

In a fourth preferred embodiment of the hydroelectric generator of the present invention, as illustrated in FIG. 30, the axis of rotation of the rotor is perpendicular to the central axis of the generator housing and therefore, to the fluid flow vector and the central axis of the pipeline, at that point.

As illustrated in FIG. 30, the rotor 800 may be configured to rotate about an axis 802 that is perpendicular to the central axis of the generator housing. Adjacent to and upstream from the rotor 800 a flow-directing barrier 804 is configured so as to direct the flow of fluid against the blades 806n and 806s of the rotor 800 in a manner that causes rotation of the rotor 800.

The blades of the rotor 800 are configured such that the magnetic polarity is reversed with each successive blade. Therefore, each blade 806n having north magnetic polarity is followed by a blade 806s having south magnetic polarity. Similarly, each blade 806s having south magnetic polarity is followed by a blade 806n having north magnetic polarity. Induction coils 808 are deployed on the exterior of the generator housing 820. Induction coils 808 may be arranged in any suitable configuration known in the art such that the rotation of rotor 800 will induce electrical current flow in the induction coils 808. A preferred arrangement of the induction coils 808 is illustrated in FIG. 30. As seen here, two induction coils 808 are deployed on the ferromagnetic core 810. It should be noted that the ferromagnetic core 810 may be constructed as described above with regard to FIGS. 9A-9C, or in any other suitable configuration.

It will be appreciated that the above descriptions are intended only to serve as examples and that many other embodiments are possible within the spirit and the scope of the present invention.

What is claimed is:

1. A pipeline deployed electric generator comprising:
   (a) a rotor having rotor blades extending outwardly from a central axle, said rotor being deployed within the pipeline so as to be in a fluid flow path of the pipeline such that a flow of fluid through the pipeline effects rotation of said rotor, and at least a portion of said rotor being magnetized; and
   (b) at least one induction coil deployed on an exterior surface of the pipeline in proximity to said rotor such that a change in magnetic field caused by rotation of said rotor within the pipeline generates a flow of electric current in said induction coil;
   wherein said rotor has an axis of rotation that is substantially parallel to a central axis of the pipeline at a region of the pipeline in which said rotor is deployed and said rotor is configured with a substantially cylindrical wall that is spaced apart from and circumscribes said central axle of said rotor and is spaced apart form an inside wall of said pipeline and at least a portion of said rotor blades extend outwardly from said cylindrical wall and the generator further includes:
   (c) a flow impedance regulator developed in an interior region defined by said cylindrical wall so as to block fluid flow through said interior region defined by said cylindrical wall at low flow rates and allow the passage of fluid through said interior region defined by said cylindrical wall at high flow rates.

2. The generator of claim 1, wherein said at least a portion of said rotor that is magnetic is at least a portion of at least one rotor blade.

3. The generator of claim 1, further including a fluid directing configuration associated with said rotor and configured to direct said fluid flow path so as to pass between said cylindrical wall and an interior surface of the pipeline so as to impinge of the rotor blades thereby generating rotation of said rotor.

4. The generator of claim 3, further including a flow impedance regulator deployed in said fluid directing configuration so as to block fluid flow through an interior region of said fluid directing configuration at low flow rates and allow the passage of fluid through said interior region of said fluid directing configuration at high flow rates.

5. The generator of claim 4, wherein said flow impedance regulator is configured to direct at least of portion of fluid flowing through said interior region of said fluid directing configuration to a portion of said rotor blades deployed within said interior region of said fluid directing configuration.

6. The generator of claim 1, wherein said rotor has an axis of rotation that is substantially perpendicular to a central axis of the pipeline.

7. The generator of claim 6, further including a flow-directing barrier deployed up stream and in close proximity to said rotor.

8. The generator of claim 1, further including a generator housing having a fluid flow passage configured between inlet and outlet ports said inlet and outlet ports being configured for attachment to the pipeline, wherein said rotor is deployed within said fluid flow passage and in said fluid flow path of the pipeline, and said induction coils are deployed on an exterior surface of said generator housing such that fluid remains sealed within the pipeline with no passage of fluid to the region of said generator housing in which said induction coil is deployed.

9. The generator of claim 8, wherein at least said induction coils are enclosed in a pre-sealed, watertight casing.

10. The generator of claim 8, wherein said generator housing has a length that is less than three times a diameter of the pipeline.

11. The generator of claim 8, wherein said generator housing has a length that is less than two times the diameter of the pipe.

12. The generator of claim 1, wherein said flow of electric current generated in said induction coils is used to power electronic components associated with at least one from the group consisting of a fluid flow meter; a leak indicator; a fluid usage meter; a sprinkler system; a irrigation system; a lighting system; a flow control system and a fluid characteristics measurement system.

13. The generator of claims 12, wherein said electronic components include at least one from the group consisting of: a radio transponder; a control circuit; a memory chip; a lighting element; a switch; a motor; a temperature sensor; a proximity sensor; a pressure sensor; a electronically operated fluid flow control valve and a sensor configured to measure chemical properties of material flowing through the pipeline.

14. A method for generating electricity in a fluid flow pipeline, the method comprising:
   (a) providing a rotor having rotor blades extending outwardly from a central axle, at least a portion of said rotor is a magnetic;
   (b) deploying said rotor within the pipeline so as to be in a fluid flow path of the pipeline such that a flow of fluid through the pipeline effects rotation of said rotor;
   (c) providing at least one induction coil;
   (d) deploying said at least one induction coil on an exterior surface of the pipeline in proximity to said rotor such that a change in magnetic field caused by rotation of said rotor within the pipeline generates a flow of electric current in said induction coil;
   (e) effecting rotation of said rotor by providing a flow of fluid through the pipeline; and
   (f) directing said fluid flow at toward at least a first group of rotor blades during low fluid flow rate conditions and additionally toward at least a second group of rotor blades during high fluid flow rate conditions.

15. The method of claim 14, wherein said at least a portion of said rotor that is a magnetic is implemented as at least a portion of at least one rotor blade.

16. A pipeline deployed electric generator comprising:

(a) a rotor having rotor blades extending outwardly from a central axle, said rotor being deployed within the pipeline so as to be in a fluid flow path of the pipeline such that a flow of fluid through the pipeline effects rotation of said rotor, and at least a portion of said rotor being magnetized; and (b) at least one induction coil deployed on an exterior surface of the pipeline in proximity to said rotor such that a change in magnetic field caused by rotation of said rotor within the pipeline generates a flow of electric current in said induction coil;

wherein said rotor has an axis of rotation that is substantially parallel to a central axis of the pipeline at a region of the pipeline in which said rotor is deployed and said rotor is configured with a substantially cylindrical wall that is spaced apart from and circumscribes said central axle of said rotor and is spaced apart form an inside wall of said pipeline and at least a portion of said rotor blades extend outwardly from said cylindrical wall and the generator includes:

(c) a fluid directing configuration associated with said rotor and configured to direct said fluid flow path so as to pass between said cylindrical wall and an interior surface of the pipeline so as to impinge of the rotor blades thereby generating rotation of said rotor; and (d) a flow impedance regulator deployed in said fluid directing configuration so as to block fluid flow through an interior region of said fluid directing configuration at low flow rates and allow the passage of fluid through said interior region of said fluid directing configuration at high flow rates.

17. The generator of claim 16, wherein said at least a portion of said rotor that is magnetic is at least a portion of at least one rotor blade.

18. The generator of claim 16, wherein said rotor has an axis of rotation that is substantially parallel to a central axis of the pipeline at a region of the pipeline in which said rotor is deployed.

19. The generator of claim 18, wherein said flow impedance regulator is configured to direct at least of portion of fluid flowing through said interior region of said fluid directing configuration to a portion of said rotor blades deployed within said interior region of said fluid directing configuration.

20. The generator of claim 16, wherein said rotor has an axis of rotation that is substantially perpendicular to a central axis of the pipeline.

21. The generator of claim 20, further including a flow-directing barrier deployed up stream and in close proximity to said rotor.

22. The generator of claim 16, further including a generator housing having a fluid flow passage configured between inlet and outlet ports said inlet and outlet ports being configured for attachment to the pipeline, wherein said rotor is deployed within said fluid flow passage and in said fluid flow path of the pipeline, and said induction coils are deployed on an exterior surface of said generator housing such that fluid remains sealed within the pipeline with no passage of fluid to the region of said generator housing in which said induction coil is deployed.

23. The generator of claim 22, wherein at least said induction coils are enclosed in a pre-sealed, watertight casing.

24. The generator of claim 22, wherein said generator housing has a length that is less than three times a diameter of the pipeline.

25. The generator of claim 22, wherein said generator housing has a length that is less than two times the diameter of the pipe.

* * * * *